(12) United States Patent
Ishii

(10) Patent No.: US 7,917,570 B2
(45) Date of Patent: Mar. 29, 2011

(54) SENSOR DEVICE WHICH MEASURES SURROUNDING CONDITIONS AND OBTAINS A NEWLY MEASURED VALUE, RETRIEVAL DEVICE WHICH UTILIZES A NETWORK TO SEARCH SENSOR DEVICES, AND RELAY DEVICE WHICH RELAYS A COMMUNICATION BETWEEN THE SENSOR DEVICE AND THE RETRIEVAL DEVICE

(75) Inventor: Tomoki Ishii, Osaka (JP)

(73) Assignee: Panasonic Corporation, Osaka (JP)

( * ) Notice: Subject to any disclaimer, the term of this patent is extended or adjusted under 35 U.S.C. 154(b) by 1076 days.

(21) Appl. No.: 10/592,781

(22) PCT Filed: Dec. 20, 2005

(86) PCT No.: PCT/JP2005/023318
§ 371 (c)(1),
(2), (4) Date: Sep. 14, 2006

(87) PCT Pub. No.: WO2006/068112
PCT Pub. Date: Jun. 29, 2006

(65) Prior Publication Data
US 2008/0240160 A1    Oct. 2, 2008

(30) Foreign Application Priority Data
Dec. 24, 2004   (JP) .................................. 2004-372935

(51) Int. Cl.
G06F 15/16 (2006.01)
(52) U.S. Cl. ........................................ 709/200; 709/245

(58) Field of Classification Search .................. 709/200
See application file for complete search history.

(56) References Cited

U.S. PATENT DOCUMENTS
2002/0186698 A1 * 12/2002 Ceniza ........................ 370/401
(Continued)

FOREIGN PATENT DOCUMENTS
CA           2 463 095        4/2003
(Continued)

OTHER PUBLICATIONS
Raicu et al., Evaluating IPv4 to IPv6 Transition Mechanisms, 2003, IEEE, pp. 1-8.*

Primary Examiner — Kevin Bates
Assistant Examiner — Oleg Survillo
(74) Attorney, Agent, or Firm — Wenderoth, Lind & Ponack, L.L.P.

(57) ABSTRACT

The sensor device having an address storage unit 107 storing a channel address to be used, a temperature sensor 103, a table storage unit 101 storing an address table in which a measurement value is associated with a channel address, and an address specification unit 102 specifying a channel address associated with a measured value obtained from the temperature sensor 103. The sensor device also including an address update unit 105 updating the channel address in the address storage unit 107, a judgment unit 108 judging whether or not inquiry data is directed to the channel address stored in the address storage unit 107, a response generation unit 106 generating response data which is a response to the inquiry data, and a communication unit 109 transmitting the response data to a retrieval node 120.

22 Claims, 14 Drawing Sheets

| Address table | | |
|---|---|---|
| | Temperature range | Multi-cast address |
| A0 | −50.5℃ −49.5℃ | ff15::2:100 |
| A1 | −49.5℃ −48.5℃ | ff15::3:101 |
| A2 | −48.5℃ −47.5℃ | ff15::4:102 |
| ⋮ | ⋮ | ⋮ |
| B0 | +17.5℃ +18.5℃ | ff15::5:100 |
| B1 | +18.5℃ +19.5℃ | ff15::5:102 |
| B2 | +19.5℃ +20.5℃ | ff15::5:104 |
| B3 | +20.5℃ +21.5℃ | ff15::5:106 |
| B4 | +21.5℃ +22.5℃ | ff15::5:108 |
| ⋮ | ⋮ | ⋮ |
| C0 | +47.5℃ +48.5℃ | ff15::2:101 |
| C1 | +48.5℃ +49.5℃ | ff15::2:102 |
| C2 | +49.5℃ +50.5℃ | ff15::2:103 |

U.S. PATENT DOCUMENTS

| | | |
|---|---|---|
| 2003/0053427 A1 | 3/2003 | Kanda et al. |
| 2003/0120817 A1 | 6/2003 | Ott et al. |
| 2004/0075738 A1* | 4/2004 | Burke et al. .................. 348/143 |
| 2004/0100983 A1* | 5/2004 | Suzuki ......................... 370/432 |
| 2005/0013257 A1* | 1/2005 | Garyfalos et al. ............ 370/252 |
| 2005/0035873 A1* | 2/2005 | Kimura .................... 340/825.72 |
| 2005/0267993 A1* | 12/2005 | Huitema et al. .............. 709/245 |

FOREIGN PATENT DOCUMENTS

| | | |
|---|---|---|
| JP | 2003-092596 | 3/2003 |
| JP | 2004-173108 | 6/2004 |
| JP | 2004-200821 | 7/2004 |
| JP | 2004-235871 | 8/2004 |
| JP | 2005-012462 | 1/2005 |
| WO | 03/034255 | 4/2003 |

* cited by examiner

FIG. 4

Address table

| | Temperature range | Multi-cast address |
|---|---|---|
| A0 | −50.5℃  −49.5℃ | ff15::2:100 |
| A1 | −49.5℃  −48.5℃ | ff15::3:101 |
| A2 | −48.5℃  −47.5℃ | ff15::4:102 |
| | ⋮ | ⋮ |
| B0 | +17.5℃  +18.5℃ | ff15::5:100 |
| B1 | +18.5℃  +19.5℃ | ff15::5:102 |
| B2 | +19.5℃  +20.5℃ | ff15::5:104 |
| B3 | +20.5℃  +21.5℃ | ff15::5:106 |
| B4 | +21.5℃  +22.5℃ | ff15::5:108 |
| | ⋮ | ⋮ |
| C0 | +47.5℃  +48.5℃ | ff15::2:101 |
| C1 | +48.5℃  +49.5℃ | ff15::2:102 |
| C2 | +49.5℃  +50.5℃ | ff15::2:103 |

FIG. 7

| Data type | Inquiry data ID | Inquiry property | Detail data |
|---|---|---|---|

0x0001:Inquiry data
0x0002:Response data

0x0000: Not specified 0xFFFFFFFF: None
0x0001: Humidity
0x0002: Temperature
0x0003: Individual identification number
0x0004: Positional information

FIG. 8

(A) Inquiry data
Transmission source : Retrieval node
Transmission destination : Channel address

| 0x0001 | 0x0011 | 0x0000 | 0xFFFFFFFF |

Response data
Transmission source : Sensor node address
Transmission destination : Retrieval node

| 0x0002 | 0x0011 | 0x0000 | 0xFFFFFFFF |

(B) Inquiry data
Transmission source : Retrieval node
Transmission destination : Channel address

| 0x0001 | 0x0012 | 0x0001 | 0xFFFFFFFF |

Response data
Transmission source : Sensor node address
Transmission destination : Retrieval node

| 0x0002 | 0x0012 | 0x0001 | 0x0000002D(45%) |

(C) Inquiry data
Transmission source : Retrieval node
Transmission destination : Channel address

| 0x0001 | 0x0013 | 0x0002 | 0x00000014(20°C) |

Response data
Transmission source : Sensor node address
Transmission destination : Retrieval node

| 0x0002 | 0x0013 | 0x0002 | 0x00000014(20°C) |

(D) Inquiry data
Transmission source : Retrieval node
Transmission destination : Channel address

| 0x0001 | 0x0014 | 0x0000 | 0x19502050 |

Response data
Transmission source : Sensor node address
Transmission destination : Retrieval node

| 0x0002 | 0x0014 | 0x0000 | 0x18502050 |

FIG. 10

| | Address table | |
|---|---|---|
| | Temperature range | Peer ID of bind point |
| D0 | −50.5℃　−49.5℃ | uuid-094AB61B99C14AB6 |
| D1 | −49.5℃　−48.5℃ | uuid-94D5BFD56C66E512 |
| D2 | −48.5℃　−47.5℃ | uuid-FF790EA1E6F4C238 |
| | ⋮ | ⋮ |
| E0 | +17.5℃　+18.5℃ | uuid-A26BB362B8A3FF02 |
| E1 | +18.5℃　+19.5℃ | uuid-4AB694D5BFD56C66 |
| E2 | +19.5℃　+20.5℃ | uuid-4C238FF790EA1E6F |
| E3 | +20.5℃　+21.5℃ | uuid-66E512FF790EA1E6 |
| E4 | +21.5℃　+22.5℃ | uuid-E6F4C238A26BB362 |
| | ⋮ | ⋮ |
| F0 | +47.5℃　+48.5℃ | uuid-56C66E512FF790EA |
| F1 | +48.5℃　+49.5℃ | uuid-1B99C14AB694D5BF |
| F2 | +49.5℃　+50.5℃ | uuid-F4C238A26BB362B8 |

FIG. 12

Individual identification number

| 8 bits | 28 bits | 24 bits | 36 bits |
|---|---|---|---|
| Version | Manufacturer ID | Product ID | Individual ID |

FIG. 13

| Address table ||
|---|---|
| Manufacturer ID | Multi-cast address |
| A0  0x3000000 | ff15::2:100 |
| A1  0x3000008 | ff15::3:101 |
| A2  0x3000010 | ff15::4:102 |

A NEWLY MEASURED VALUE, RETRIEVAL
DEVICE WHICH UTILIZES A NETWORK TO
SEARCH SENSOR DEVICES, AND RELAY
DEVICE WHICH RELAYS A
COMMUNICATION BETWEEN THE SENSOR
DEVICE AND THE RETRIEVAL DEVICE

BACKGROUND OF THE INVENTION

1. Field of Invention

The present invention relates to a sensor device which measures surrounding conditions, a retrieval device which searches sensor devices via a network, and a relay device which relays between the sensor devices and the retrieval device.

2. Description of the Related Art

Conventionally, there has been provided a sensor network which is a network system for use in observing natural phenomena such as climate and temperature, surveying the conditions in the event of a natural disaster, and managing stocks. In the sensor network, an Internet Protocol (IP) network, for example, is used as a backbone for connecting each of the components such as a sensor and a database, in order to realize a wide range of services.

For connecting a sensor to the network, a sensor node, which is a sensor device incorporating one or more sensors and a network communication function as one, is used.

In order to make use of the sensor network, it is necessary to communicate with sensor nodes which are capable of obtaining information required for an application program or a service, and to collect the derived data at the side of the application program or a service providing apparatus by operating the sensors on the sensor nodes. Moreover, it is also necessary to provide the user with the collected data or the calculation results obtained based on the data, or to control an actuator based on the calculation results.

In this case, the sensors to be actually used for measurement have to be selected and specified from among many sensors. Therefore, a search function for searching on sensor nodes is required.

Static property search and dynamic property search are provided for the search on sensor nodes. For example, a sensor network equipped with sensor nodes each having a temperature/humidity sensor and being fixedly set in plural locations can be taken as an example here.

In this case, pre-set location, temperature, humidity and the like are conceivable as the properties of the sensor nodes. Among them, the "location" property is a static property owing to the fact that the sensor node is fixedly set, whereas "temperature" and "humidity" properties are dynamic properties which change depending on the time of measurement.

In the case of searching the sensors that are set within a certain region by use of this sensor network, a retrieval node which searches the sensor nodes and transmits inquiry data requesting positional information to all the sensor nodes, and causes the sensor nodes located within the target region to return response data. Based on this, a conceivable method is one in which the retrieval node side lists up the respective sensor node addresses indicated in the response data. However, in a sensor network in which many sensor nodes are set, because the area in which broadcasting is performed is spread out, the communication bands are overloaded and wasteful expenses arise, and thus the abovementioned method is not realistic in terms of scalability.

This is why a method using database, as shown in FIG. 1, is conventionally used.

FIG. 1 is a diagram showing an outline of the conventional sensor network utilizing database for the search of sensor nodes.

In the sensor network 205 shown in FIG. 1, a database 204 manages a correspondence table which associates the positional information of sensor nodes 202 and 203 with the addresses thereof. A retrieval node 201 performs database retrieval, setting positional information as a search condition. The retrieval node can thus list up the addresses of the sensor nodes which fall within the search condition, without making an inquiry to the sensor nodes 202 and 203.

Such a technique in which a sensor network utilizes a database to conduct a search on sensor nodes has been disclosed (e.g. Patent Reference 1).

A sensor network that searches the sensor nodes utilizing a multi-cast communication is provided as a sensor network that searches sensor nodes without making an inquiry to each sensor node.

In such a sensor network, each sensor node is equipped in each automatic dispenser. A sensor in each of the sensor nodes aims to count the remaining quantity for each type of juice placed in an automatic dispenser, and each type of juice is associated, on a one-to-one basis, with a channel address in the multi-cast communication. Also, the information indicating this association is also placed on a server on the network together with the positional information of each automatic dispenser.

The retrieval node receives the type of juice as a search condition, and obtains, from the server, the channel address associated with the search condition. The retrieval node also transmits a reply request to the obtained channel address. The reply request transmitted to the channel address ensures that only the sensor nodes which participate in the channel corresponding to that channel address are targeted for processing, e.g., response.

The retrieval node can identify the automatic dispensers to be searched for, based on the responses received from the respective automatic dispensers.

Thus, in the case of using the multi-cast communication, there is no need for the retrieval node to transmit a reply request to each sensor node. The sensor nodes which do not participate in the channel to be used for the transmission of the reply request do not need to perform processing, e.g., analysis on the reply request. In the case where a sensor node is placed on the network under a router, a reply request goes through the filtering performed by the router so that the reply request of the channel in which the sensor node under the router is presently participating can pass the router. Therefore, the reply request which is unnecessary for the network under that router shall not pass through.

Such a technique regarding the sensor network utilizing multi-cast communication has also been disclosed (e.g. Patent Reference 2).

Patent Reference 1: Japanese Laid-Open Patent Application No. 2004-173108
Patent Reference 2: Japanese Laid-Open Patent Application No. 2004-200821

BRIEF SUMMARY OF THE INVENTION

Here, the case of searching sensor nodes based on dynamic property under the sensor network system is assumed. For example, it is assumed that the sensor nodes located in a place in which the temperature is within a certain range are to be searched out.

In such a case, with the sensor network utilizing the database as described above, it is necessary to register in advance a temperature of each sensor node into a database. However, since a temperature is a dynamic property that changes from time to time, the information has to be maintained by updating, at regular intervals, the correspondence table stored in the database.

Therefore, the updated data from each sensor node concentrates on a band directly under the database system, which overloads the band, increases the load of the processor at the database side, and inhibits the securing of scalability. In order to solve such problems, it is an urgent need to introduce/manage a load sharing system. However, the overload of the band as well as the increase in the load has no upper limit due to the increase in the number of sensor nodes. It is therefore not possible to essentially solve the problems. Moreover, the update interval cannot be made longer since the real-timeness of a measured value measured by a sensor is lost depending on the length of the update interval at which the database is updated. Needless to say, with such a method, there is a necessity for introduction/management of a new database system.

In the case of the sensor network utilizing the aforementioned multi-cast communication, the retrieval node has to only transmit inquiry data for inquiring each channel of a measured temperature. The loads imposed on the network and the retrieval node will be reduced compared to the case of transmitting inquiry data to each sensor node.

Nevertheless, all the sensor nodes need to perform processing for generating response data, for example, analysis on the details of the transmission data transmitted from the retrieval node. For example, in the case where the retrieval node retrieves the sensor nodes with a measured temperature of 20 Celsius, the sensor nodes with a measured temperature that is far from 20 Celsius also have to perform processing, e.g., analysis on the inquiry data. That is to say that the sensor nodes are forced to perform unnecessary processing.

The present invention is conceived in view of the abovementioned problems, and an object of the present invention is to provide a sensor device, a retrieval device and a relay device that relays the communication between the sensor device and the retrieval device, which configure a sensor network and are intended for a flexible search of sensor devices based on dynamic property, as well as for a prevention of the unnecessary loads imposed on the network and each of the devices due to the search.

In order to solve the above-mentioned problems, the sensor device according to the present invention is a sensor device which communicates with an other device via a network having channels for communication, wherein each of the channels is associated with a channel address for communication in each channel. The sensor device includes: an address storage unit which stores a channel address to be used for the communication with the other device; a measurement unit which measures a surrounding status, and to obtain a measured value; a table storage unit which stores an address table in which a measurement value obtainable by the measurement unit is associated with a channel address; a specification unit which obtains the measured value from said measurement unit, and to specify a channel address associated with the measured value, by referring to the address table; an update unit which updates the channel address stored in the address storage unit to the channel address specified by the specification unit; a receiving unit which receives inquiry data transmitted from the other device; a judgment unit which judges whether or not the inquiry data received by the receiving unit is directed to the channel address stored in the address storage unit; a response generation unit which generates response data which is a response to the inquiry data, in the case where said judgment unit judges that the inquiry data is directed to the channel address; and a transmission unit which transmits the response data generated by the response generation unit to the other device.

With such a configuration, the sensor device of the present invention can handle a measured value which dynamically changes, and update the channel via which the sensor device communicates. In other words, in the case of searching such sensor devices based on dynamic property, that is, a measured value, inquiry data needs to be transmitted to the channel that meets the search condition. Also, the sensor device can judge, via a judgment unit, whether or not to perform processing for response data. Thus, there is not need to perform processing for unnecessary response data, and it is possible to respond only to the inquiry data to be responded, and thereby the device which has transmitted the inquiry data can receive response data.

In this way, the sensor device of the present invention is a sensor device which does not require a conventional database system, and allows itself to be searched flexibly based on dynamic property and does not cause any unnecessary loads.

In the sensor device according to the present invention, the update unit may transmit, when updating the channel address stored in said address storage unit via said transmission unit, a request for withdrawal from the channel of the channel address before the update and a request for participation in the channel of the updated channel address, to a communication device connected to the network, and the receiving unit may receive the inquiry data transmitted from the other device outside the network via the communication device and the network.

Thus, in the case of using, as a communication device, a router which relays communication with an external network, for example, it is possible to make requests to the router for participation in and withdrawal from a certain channel. Since the router does not send, to the devices under the router, the inquiry data transmitted from an external network, using a channel in which the sensor device is not participating, inquiry data will not be unnecessarily transmitted to the network to which the sensor device is connected.

In the sensor device of the present invention, the update unit may update the channel address stored in the address storage unit to the channel address specified by the specification unit, in the case where the measured value obtained by the specification unit from the measurement unit is not included in a measurement value associated with the channel address stored in the address storage unit, and may not update the channel address stored in the address storage unit in the case where the measured value obtained by the specification unit from the measurement unit is included in the measurement value associated with the channel address stored in the address storage unit. Also, the update unit may update the channel address stored in the address storage unit to the channel address specified by the specification unit, in the case where the channel address specified by the specification unit is different from the channel address stored in the address storage unit, and may not update the channel address stored in the address storage unit in the case where the channel address specified by the specification unit is as same as the channel address stored in the address storage unit.

In any of the abovementioned configurations, the channel to be used in communication is updated only when necessary. In other words, it is possible to render the entire processing performed by the sensor device more efficient.

Also, in the sensor device of the present invention, the channel address recorded in the address table may be an Internet Protocol (IP) multi-cast address, or a peer address of a bind point in a peer-to-peer (P2P) network.

This means that the network to which the sensor device of the present invention is connected only need to be a network which enables communication using plural channels. Therefore, it is possible to use the sensor device by connecting it to various existing networks.

Also, in the sensor device of the present invention, the update unit may update the channel address stored in the address storage unit to the channel address specified by the specification unit, by additionally storing the channel address specified by said specification unit into said address storage unit, and deleting the channel address stored in said address storage unit prior to the additional storage of the channel address, after a predetermined time has elapsed from the additional storage.

Thus, it is possible to reduce the traffic in the highly-frequent channel participation and withdrawal processing caused in the case where a measured value obtained by a measurement unit repeatedly varies in a short period of time. Also, it is possible, at least, to maintain the state in which the sensor node is participating in the channel that requires participation.

In the sensor device of the present invention, the response generation unit may obtain, from the address table, a measurement value associated with a destination address of the inquiry data received by the receiving unit, and to generate response data which includes the measurement value. The response generation unit may also obtain the measured value from said measurement unit, and generate response data which includes the measured value.

Thus, it is possible to notify the device which has transmitted the inquiry data of a correlation between a channel address and a measured value of the sensor device, and an actually-measured value.

Also, in the sensor device of the present invention, an object to be measured by the measurement unit may be a wireless tag which has identification information identifying the wireless tag, and the measurement unit may obtain, via wireless communication, the identification information as a measured value by reading the identification information of the wireless tag.

Thus, the sensor device of the present invention can be applied to a management system for managing distributed products each of which is attached with a wireless tag.

The relay device according to the present invention is a relay device which relays a communication between a sensor device connected to a first network and a retrieval device connected to a second network, the sensor device measuring a surrounding status and obtaining a measured value, wherein the respective first and second networks have channels for communication, and each of the channels is associated with a channel address for communication in each channel. The relay device includes: a relay source table storage unit which stores a relay source address table in which a measurement value obtainable by the sensor device is associated with a channel address on the second network; a relay destination table storage unit which stores a relay destination address table in which a measurement value obtainable by the sensor device is associated with a channel address on the first network; a relay address storage unit which stores a channel address necessary for the relay, among the channel addresses recorded in the relay source address table; an update unit which updates the channel address stored in the relay address storage unit to another channel address recorded in the relay source address table, based on a predetermined instruction; a judgment unit which judges whether or not the inquiry data transmitted from the retrieval device is directed to the channel address stored in the relay address storage unit; a measurement value identification unit which identifies, in the case where the judgment unit judges that the inquiry data is directed to the channel address stored in the relay address storage unit, using the inquiry data, a measurement value associated with the channel address; a relay destination specification unit which specifies the channel address on the first network, which is associated with the measurement value identified by the measurement value identification unit, by referring to the relay destination address table; and a transfer unit which transmits the inquiry data to the channel address specified by said relay destination specification unit.

Thus, the retrieval device can transparently conduct a search based on dynamic property even in the case where the retrieval device and the sensor device are connected to the sensor networks of different network address allocation policies.

In addition, the relay device of the present invention is, as is the case of the sensor device, also capable of updating the channel address to be used for receiving inquiry data, and therefore, can be adaptive to a change in the transmission channel of the inquiry data required in a change of a search condition, and conduct a flexible search.

In the relay device of the present invention, the measurement value identification unit may obtain a destination of the inquiry data, and identify a measurement value associated with a channel address which is the destination of the inquiry data, by referring to the relay source address table.

Thus, even in the case where the inquiry data does not include information indicating the measurement value that corresponds to that inquiry data, the measurement value can be identified.

The retrieval device according to the present invention is a retrieval device which searches sensor devices that measure a surrounding status and that obtain a measured value, via a network having channels for communication, wherein each of the channels is associated with a channel address for communication in each channel, and the retrieval device includes: a table storage unit which stores an address table in which a measurement value obtainable by the sensor device is associated with a channel address; a receiving unit which receives a search condition which includes information indicating a measurement value obtainable by the sensor device; a specification unit which specifies a channel address associated with the search condition received by the receiving unit, by referring to the address table; an inquiry generation unit which generates, based on the search condition, inquiry data to be directed to the sensor device which meets the search condition; and a communication unit which transmits the inquiry data to the channel address specified by the specification unit, and to receive response data which is a response transmitted in response to the inquiry data, from each sensor device.

Thus, it is possible to search sensor devices based on measured values of the sensor devices, which are dynamic properties.

The present invention can be realized as a search system equipped with the sensor device and the retrieval device of the present invention. Moreover, with the relay device of the present invention, the retrieval device can transparently conduct a search based on a dynamic property even in the case where the sensor device and the retrieval device are each connected to the sensor networks of different network address allocation policies.

In addition, the present invention can be realized as a method which includes, as steps, the characteristic components included in the sensor device, the retrieval device and the relay device according to the present invention. The invention can be realized as a program which includes these steps, or as a storage medium, e.g., a CD-ROM, in which the program is stored, and even as an integrated circuit. The program can be distributed via a transmission medium, for example, a communication network or the like.

The present invention provides a sensor device, a retrieval device, and a relay device with which it is possible to conduct a flexible search on sensor devices based on dynamic property, and to prevent the unnecessary loads imposed on the network and each of the devices due to the search.

More precisely, according to the present invention, it is possible to search sensor devices by setting, as a search condition, a property which dynamically changes, for example, an ambient temperature around the sensor device, and to list up the sensor devices that meet the search condition, without using a database.

In the sensor device of the present invention, a channel address is updated according to a measured value. Therefore, it is possible for the retrieval device to obtain an appropriate result in accordance with each search condition even in the case of changing the search condition in various ways within the range of the measurement value obtainable by the sensor device.

For example, it is also possible to obtain, with one inquiry, humidity measured by the sensor device that obtains a predetermined temperature as a measured value. In other words, it is possible to obtain, with one inquiry, humidity in the location that indicates a predetermined temperature.

Even in the case where the retrieval device and the sensor device are connected, via the relay device of the present invention, to the sensor networks of different network address allocation policies, it is possible for the retrieval device to transparently conduct a search based on dynamic property.

BRIEF DESCRIPTION OF DRAWINGS

FIG. 4 is a diagram showing an example of the data structure of an address table according to the first embodiment of the present invention.

FIG. 7 is a diagram showing an example of the data formats of inquiry data and response data which are located in a payload portion of an UDF packet.

FIGS. 8A to 8D are diagrams showing plural examples of the details of the inquiry data and the response data according to the first embodiment.

FIG. 10 is a diagram showing an example of the data structure of the address table in the case of using a P2P network as a network between a sensor node and a retrieval node.

FIG. 12 is a diagram showing an example of the data structure of the individual identification number according to the second embodiment.

FIG. 13 is a diagram showing an example of the data structure of the address table according to the second embodiment.

NUMERICAL REFERENCES

Figure 1:
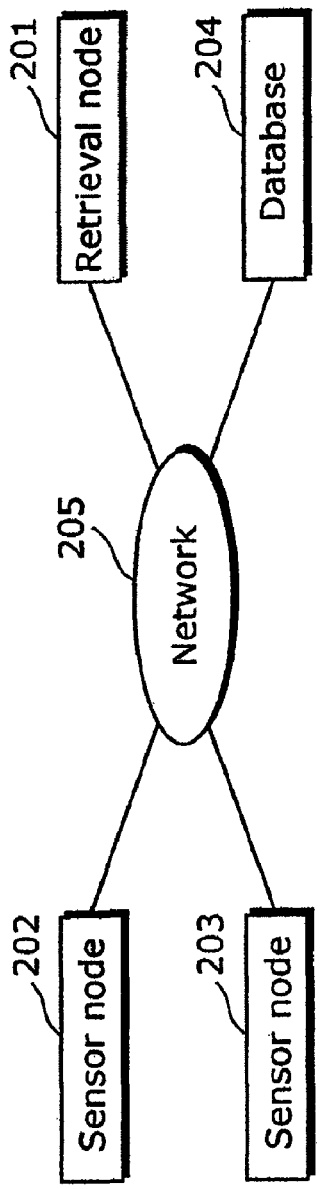
FIG. 1 is a diagram showing an outline of a conventional sensor network utilizing database in a search on sensor nodes.

100 Sensor node
101 Table storage unit
102 Address specification unit
103 Temperature sensor
104 Humidity sensor
105 Address update unit
106 Response generation unit
107 Address storage unit
108, 807 Judgment unit
109 Communication unit
110 Router
111 IPv6 network
112 Router
120, 920 Retrieval node
121 Table storage unit
122 Address specification unit
123 Generation unit
124 Receiving unit
125 Communication unit
126 Response processing unit
703 P2P network
708 Ad-hoc network
800, 810 Relay node
801 Relay source table storage unit
802 Relay destination table storage unit
803 Relay address update unit
804, 814 Section specification unit
805 Relay destination specification unit
806 Relay address storage unit
808 Transfer unit
900 ID scanner node
901 Table storage unit
904 ID scanner
930, 931 Wireless tag

DETAILED DESCRIPTION OF THE INVENTION

The following describes the sensor node, retrieval node and the relay node according to the embodiment of the present invention, with reference to the diagrams.

First Embodiment

Firstly, the configuration of the sensor node and the retrieval node according to the first embodiment will be described with reference to FIGS. 2 through 4.

Figure 2:
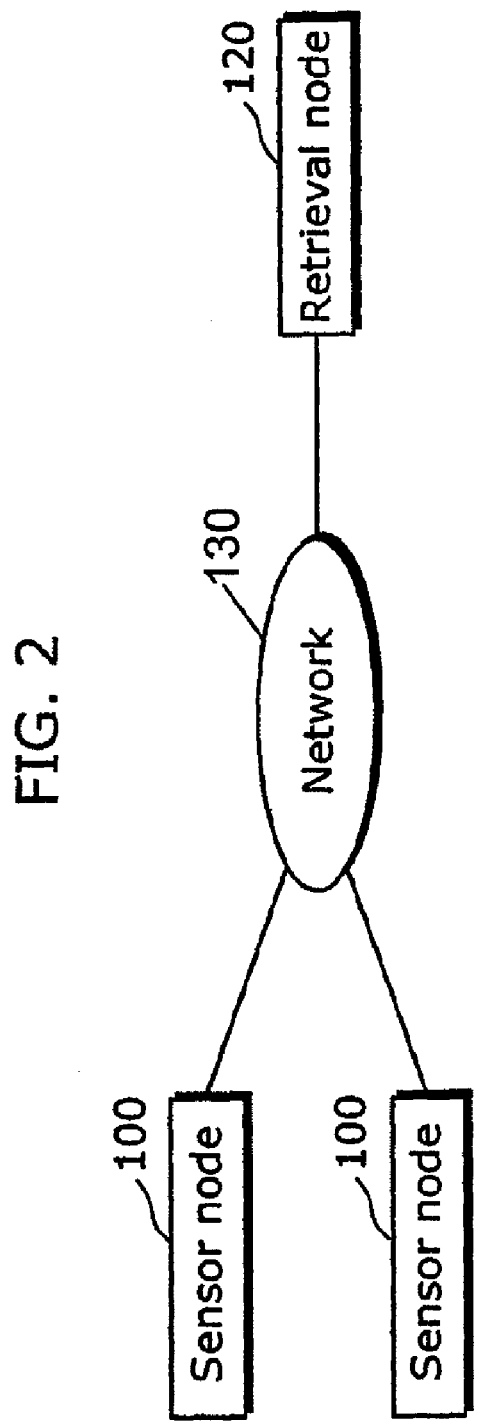
FIG. 2 is a diagram showing an outline configuration of the sensor network according to a first embodiment of the present invention.

FIG. 2 is a diagram showing an outline configuration of the sensor network according to the first embodiment of the present invention.

As shown in FIG. 2, the sensor network according to the first embodiment is comprised of a retrieval node 120 and plural sensor nodes 100. The sensor node 100 is an example of the sensor device of the present invention whereas the retrieval node 120 is an example of the retrieval device of the present invention.

The retrieval node 120 and the sensor nodes 100 are connected to a network 130, and can communicate with each other. The network 130 is a network that has plural channels for the communication.

Note that the first through third embodiments below describe the case of using an Internet Protocol Version 6 (IPv6) network as the network 130.

Figure 3:
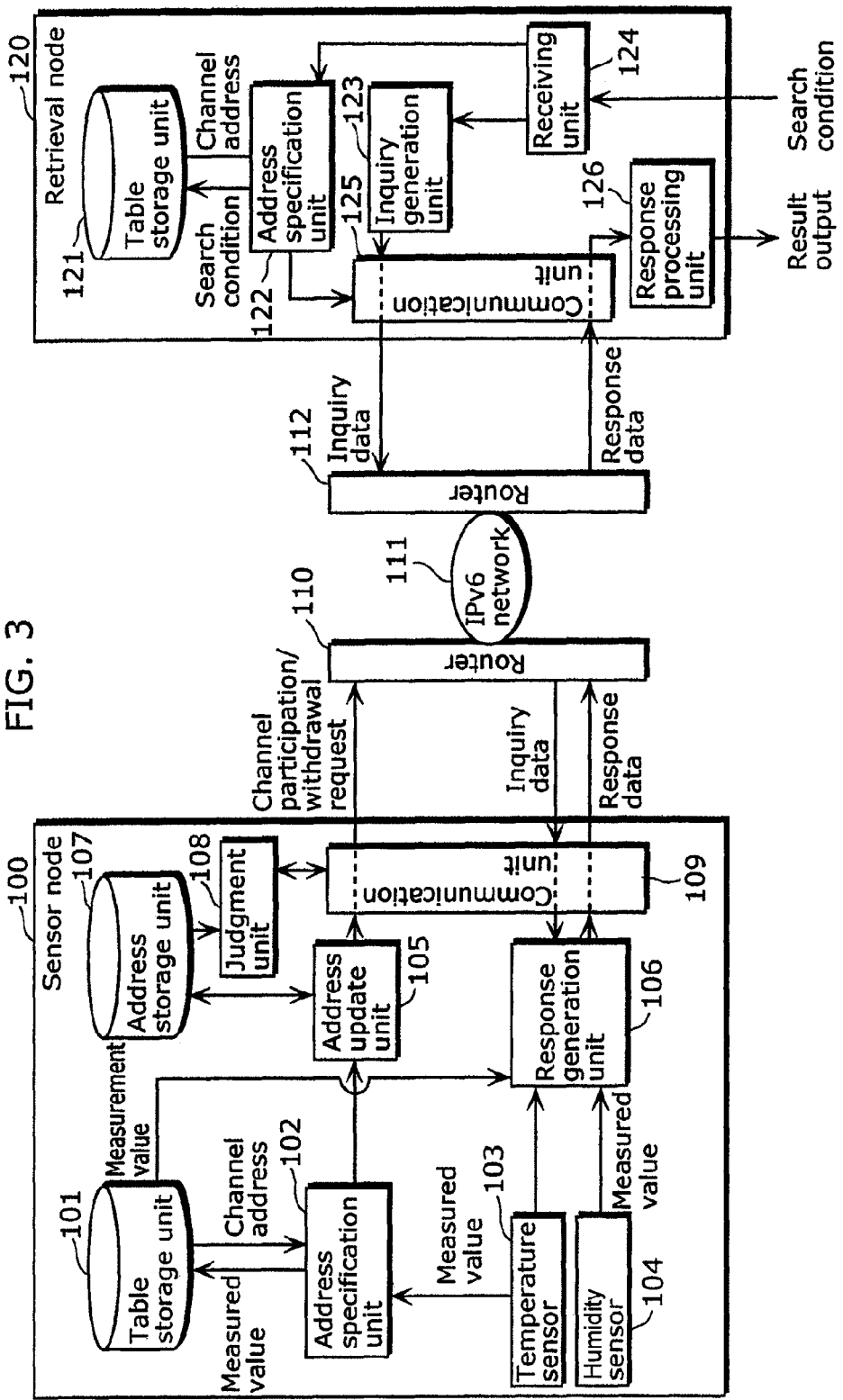
FIG. 3 is a function block diagram showing a functional configuration of a sensor node and a retrieval node according to the first embodiment of the present invention.

FIG. 3 is a functional block diagram showing the functional configuration of the sensor node and the retrieval node according to the first embodiment of the present invention. Note that the number of the retrieval nodes 120 and the sensor nodes 100 may be plural in the network, though not shown in the diagram. Although the sensor node 100 and the retrieval node 120 have other components for communication or the like, they are not shown in the diagram and the descriptions are omitted. Only the components characteristic to the present invention are shown in the diagram and described below.

As shown in FIG. 3, the sensor node is connected to the IPv6 network 111 via a router 110, while the retrieval node 120 is connected to the IPv6 network 111 via a router 112. The routers 110 and 112 are routers compatible with multi-cast communication. Note that the router 110 is an example of the communication device which receives requests for participation in and withdrawal from a channel, which are made by the sensor device of the present invention.

Thus, the sensor network of the present embodiment is a sensor network that is realized on an IP network.

(Sensor Node)

The sensor node 100 includes a table storage unit 101, an address specification unit 102, a temperature sensor 103, a humidity sensor 104, an address storage unit 107, an address update unit 105, a response generation unit 106, a judgment unit 108 and a communication unit 109.

The table storage unit 101 is a storage apparatus which stores an address table in which an association between a measurement value that is obtainable by the temperature sensor 103 and a channel address in the multi-cast communication is stored. The address table will be mentioned later with reference to FIG. 4.

The address specification unit 102 is a processing unit which obtains a measured value from the temperature sensor 103, and specifies a channel address associated with the measured value, by referring to the address table. The temperature sensor 103 and the humidity sensor 104 are the sensors each of which measures a surrounding status and obtains a measured value. More precisely, the temperature sensor 103 measures temperature around the sensor itself, whereas the humidity sensor 104 measures humidity around the sensor itself. Note that the temperature sensor 103 and the humidity sensor 104 are examples of a measurement unit in the sensor device of the present invention.

The address storage unit 107 is a storage apparatus which stores a channel address to be used in the communication between the sensor node 100 and the retrieval node 120. To be concrete, the channel address, which is a destination of the data to be received by the sensor node 100, is stored.

The address update unit 105 is a processing unit which updates a channel address stored in the address storage unit 107 to the channel address specified by the address specification unit 102.

The address update unit 105 transmits, to the router 110, a request for participation in a channel of the channel address which has been updated as well as a request for withdrawal from a channel of the channel address before the update takes place, to which the sensor node 100 has been participating. Hereinafter, the term "participation channel address" refers to a channel address of a channel to which the sensor node 100 is presently participating, and also refers to the channel address stored in the address storage unit 107.

The communication unit 109 is a processing unit which exchanges data with the retrieval node 120. Note that the data transmission function to be exercised by a receiving unit and a transmitting unit in the retrieval device of the present invention can be realized by the communication unit 109.

The judgment unit 108 is a processing unit which judges whether or not the destination of the data received by the communication unit 109 is a participation channel address. In other words, the judgment unit 108 is a processing unit which judges whether or not the data received by the communication unit 109 is transmitted using the channel in which the sensor node 100 is presently participating.

The response generation unit 106 is a processing unit which analyzes the data whose destination is judged to be a participation channel address, and generates response data.

(Retrieval Node)

The retrieval node 120 includes a table storage unit 121, an address specification unit 122, an inquiry generation unit 123, a receiving unit 124, a communication unit 125 and a response processing unit 126.

The table storage unit 121 is a storage apparatus which stores an address table in which an association between a measurement value obtainable by the temperature sensor 103 of the sensor node 100 and a channel address in the multi-cast communication is stored. In other words, the address table stored in the table storage unit 121 is as same as the address table stored in the table storage unit 101 of the sensor node 100.

The receiving unit 124 is a processing unit which receives a search condition to be inputted from a user or an upper system.

The search condition includes information indicating a measurement value that is obtainable by the temperature sensor 103.

The address specification unit 122 is a processing unit which specifies the channel address that meets the search condition received by the receiving unit 124, by referring to the address table stored in the table storage unit 121.

The inquiry generation unit 123 is a processing unit which generates inquiry data for inquiring the sensor node 100 of a measured value of the sensor, or the like, based on the search condition received by the receiving unit 124.

The communication unit 125 is a processing unit which exchanges data with the sensor node 100. The response processing unit 126 is a processing unit which analyzes and processes the response data transmitted from the sensor node 100 according to the inquiry data, and outputs the result of the processing to the user or to the upper system.

FIG. 4 is a diagram showing an example of the data structure of the address table according to the first embodiment of the present invention.

The address table shown in FIG. 4 is, as described above, a table in which a measurement value obtainable by the temperature sensor 103 is associated with a channel address.

In the embodiment, the range of the measurement value obtainable by the temperature sensor 103 is divided into plural sections, and information that can identify each section is associated with a channel address that corresponds to the section.

Also, the address table shown in FIG. 4 is stored both in the table storage unit 101 of the sensor node 100 and the table storage unit 121 of the retrieval node 120.

The address table is created, for example, by acquiring the channel addresses which can be used in compliance to a network policy for the sections that are required, and by signing beforehand.

The number of necessary channel addresses is determined by the system policy regarding how many sections should the range of the measurement value obtainable by the temperature sensor 103 be divided.

For example, a system policy, which defines a division into sections which match a search accuracy to be required or a division into sections so that the number of sensor nodes included in each section can be averaged, is conceivable.

The address table shown in FIG. 4 is structured based on the system policy which enables a search of temperature on a Celsius-to-Celsius basis between −50 Celsius and +50 Celsius read on a temperature axis. For example, the temperature axis near 20 Celsius is divided on the Celsius basis such as B0 (+17.5, +18.5), B1 (+18.5, +19.5), B2 (+19.5, +20.5), B3 (+20.5, 21.5), and B4 (+21.5, +22.5). Each of the sections is associated with each IP multi-cast address as a channel address, such as "ff15::5:100", "ff15::5:102", "ff15::5:104", "ff15::5:106" and "ff15::5:108".

In the sensor node 100, in the case of receiving, for instance, a measured value of "20 Celsius" from the temperature sensor 103, the address specification unit 102 can specify the channel address of "ff15::5:104" by referring to the address table shown in FIG. 4.

Also, in the retrieval node 120, in the case of receiving, from the receiving unit 124, a search condition including the information which indicates a measurement value of "21 Celsius", the address specification unit 122 can specify the channel address of "ff15::5:106" by referring to the address table shown in FIG. 4.

Thus, the sensor node 100 and the retrieval node 120 have the same address table. The state in which the sensor node 100 and the retrieval node 120 have the same address table can be realized, for example, by nonvolatilely storing in advance the same address table into a table storage unit of each node. Alternatively, it can be realized by reading in for use, at the time of activating each node, an address table by utilizing an address table distribution service provided on the sensor network. Thus, a common address table is used among the retrieval node 120 and all the sensor nodes 100.

Next, the operation of the sensor node and the retrieval node according to the first embodiment of the present invention will be described with reference to FIGS. 5 through 9.

Figure 5:
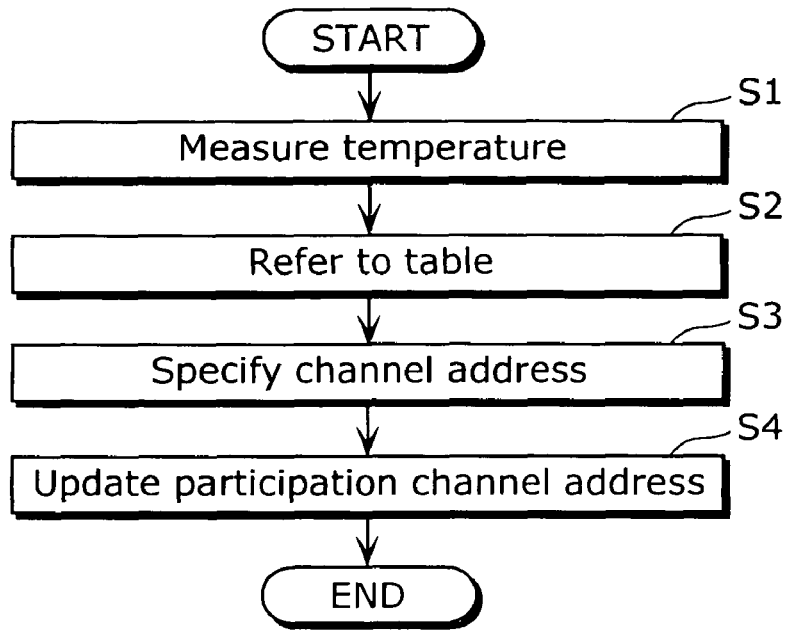
FIG. 5 is a flowchart showing the flow of the operation regarding the update of participation channel address performed in the sensor node, according to the first embodiment of the present invention.

FIG. 5 is a flowchart showing the flow of the operation regarding the update of an participation channel address performed in the sensor node 100 according to the first embodiment of the present invention.

Firstly, the flow of the operation related to the update of the participation channel address is described with reference to FIG. 5.

In the sensor node 100, the temperature 103 measures the temperature at predetermined intervals, e.g., on a minute-to-minute basis (S1). Then, the address specification unit 102 refers to the address table stored in the table storage unit 101, based on the measured value measured by the temperature sensor 103 (S2), and specifies the channel address associated with the measured value (S3).

The address update unit 105 updates the participation channel address to the specified channel address (S4).

More precisely, the address update unit 105 rewrites the channel address stored in the address storage unit 107. In the case where a channel address is not stored in the address storage unit 107, the address update unit 105 writes the specified channel address.

Moreover, the participation processing in a channel and withdrawal processing from the channel of the channel address in which the sensor node has been participating are performed. The participation and withdrawal processing are processing for the node side to notify the network side of start and cancel of a transfer, to the node, of the communication data directed to the specified channel, and are normally realized by a routing control operated in the relay device.

In the present embodiment, the participation and withdrawal processing can be achieved by the fact that the address update unit 105 transmits, to the router 110, a request for participation in the channel of the channel address that has been updated, and a request for withdrawal from the channel of the channel address that has not been updated.

The router 110 performs filtering by which only the data, which is directed to the channel address specified through the transmitted participation request, is transferred to the devices under the router 110.

Thus, in the sensor node 100, the participation channel address is updated based on the measured value obtained by the temperature sensor 103.

Figure 6:
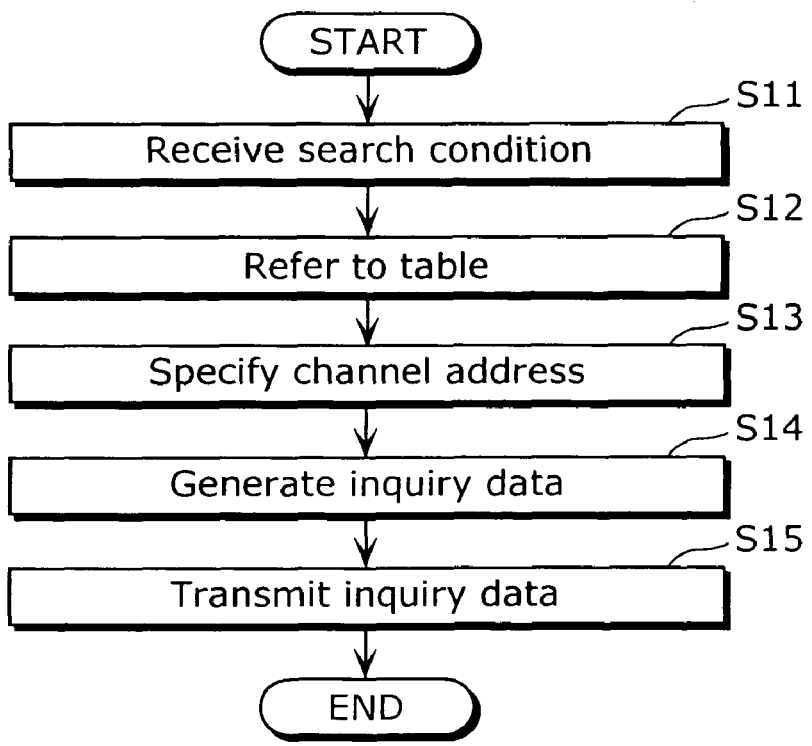
FIG. 6 is a flowchart showing the flow of the operation regarding the generation and transmission of inquiry data, performed in the retrieval node according to the first embodiment of the present invention.

FIG. 6 is a flowchart showing the flow of the operation regarding the generation and transmission of inquiry data performed in the retrieval node 120 according to the first embodiment of the present invention.

The flow of the operation related to the generation and transmission of the inquiry data, performed in the retrieval node 120, is described with reference to FIG. 6.

In the retrieval node 120, the receiving unit 124 receives a search condition inputted from the user or the upper system (S11). The search condition includes, as described above, the information indicating a measurement value obtainable by the temperature sensor 103.

The address specification unit 122 receives the search condition received by the receiving unit 124, refers to the address table stored in the table storage unit 121 (S12), and specifies the channel address that meets the search condition (S13).

Then, the inquiry generation unit 123 generates inquiry data directed to the sensor node 100 which meets the search condition, based on the search condition received by the receiving unit 124 (S14).

The communication unit 125 receives the channel address specified by the address specification unit 122, and transmits the inquiry data generated by the inquiry generation unit 123 to the specified channel address (S15). Note that the inquiry data is stored into a payload of a User Datagram Protocol (UDP), and then transmitted.

FIG. 7 is a diagram showing an example of the data format of the inquiry data and the response data in a payload portion of a UDP packet.

In other words, the inquiry data and the response data are stored into payload portion of the UDP packet and then transmitted, using the same data format.

As shown in FIG. 7, the data format has four fields: a data type field; an inquiry data ID field; an inquiry property field; and a detail data field.

The data type field is a field indicating whether or not the data held by the data type field is inquiry data or response data. The data is response data if "0x0001" is indicated in the data type field, and the data is inquiry data if "0x0011" is indicated.

The inquiry data ID field is a value of a simple increment counter for assuring the uniqueness of the inquiry data. The inquiry data is linked to the response data for that inquiry data by the inquiry data ID.

The inquiry property field is a field indicating what kind of property is being inquired. At least one value of "0x0000" through "0x0004" is stored.

Each of the values "0x0000" through "0x0004" corresponds to the respective properties of "not specified", "humidity", "temperature", "individual identification number" and "positional information".

Note that the individual identification number is identification information in accordance with the numbering system in which the uniqueness of identification number is assured on a specific domain. Electronic Product Code (EPC) system used in Radio Frequency Identification (RFID) can be raised as an example of such a numbering system. The embodiment in which the individual identification number is used as a measured value will be mentioned later as the second embodiment.

The detail data field is a field which stores the detail information on the property specified by the inquiry property. In the case where there is no detail information, "0xFFFFFFFF" will be stored.

Here, the operation of the sensor node 100 and the retrieval node 120 are described, taking the case of applying the sensor network of the present embodiment to the management of food storage facility as an example.

The storage facility has plural storages, in each of which a temperature is controlled so that the temperature in the storage room is maintained in accordance with an object to be stored. For example, 0 Celsius or below is set for frozen food, 10 Celsius or below is set for food to be kept refrigerated, and approximately 20 Celsius is set for food storable at room temperature. In each storage, the sensor node 100 equipped with the temperature sensor 103 and the humidity sensor 104 is placed so that the condition of the storage is measurable, and the sensor node 100 is connected to a control room via a network. Under such a sensor network system, it is assumed that only the storages which currently keep the temperature of 20 Celsius are searched for using, as the retrieval node 120, a computer which is intended for control and is set within the control room.

The address specification unit 102, implemented as a firmware of the sensor node 100, obtains, as a measured value, the ambient temperature measured by the temperature sensor 103. In addition, the address specification unit 102 refers to the address table stored in the table storage unit 101, and specifies the channel address, in the address table, which is associated with the measured value.

For example, in the case where the measured value obtained by the temperature sensor 103 is 20 Celsius, the measured value is included in the section B2 (+19.5, +20.5) (see FIG. 4). The address specification unit 102 therefore can specify "ff15::5:104" which is the channel address associated with the section B2.

The address update unit 105 transmits an Internet Control Message Protocol (ICMP) message directed to the channel address "ff15::5:104" to the router 110, so that the sensor node 100 participates in the multi-cast channel associated with the section B2.

In the case of obtaining a measured value of 21 Celsius through the re-measurement carried out by the temperature sensor 103, the address specification unit 102 refers to the address table and specifies "ff15::5:106" which is the channel address associated with the section B3 (+20.5, +21.5). The address update unit 105 transmits, to the router 110, an ICMP message directed to the channel address of "ff15::5:106", so that the sensor node 100 participates in the multi-cast channel corresponding to the sensor of the section B3, as well as transmits, to the router 110, an ICMP message so that the sensor node 100 withdraws from the multi-cast channel associated with the section B2 in which the sensor node 100 is presently participating.

By repeating such an operation, the sensor node 100 is in the state of participating, in a manner independent from the retrieval node 120, in the multi-cast channel associated with the measured value of the temperature sensor 103.

Note that in the case where the sensor node 100 participates in or withdraws from a certain channel, the channel address stored in the address storage unit 107 is updated to the channel address specified by the address specification unit 102. The processing of participation in and withdrawal from the channel, which requires the update, shall not be operated if there is no such need.

For example, in the case where the channel address in which the sensor node is presently participating and the channel address targeted for participation are compared and turned out to be the same, this means that the sensor node 100 is presently participating in the channel targeted for participation. Thus, it is detected that the update processing is unnecessary and the participation and withdrawal processing may be omitted.

Similarly, in the case where the measured value obtained by the address specification unit 102 from the temperature sensor 103 falls within the measurement value associated with the channel address stored in the address storage unit 107, namely, falls within the section associated with the channel in which the sensor node 100 is presently participating, the participation and withdrawal processing may be omitted. Note that such a judgment may be made by the address update unit 105, for example.

In this way, by carrying out the participation and withdrawal processing only when necessary, the entire processing in the sensor node 100 can be made more efficient.

Considering the case where a measured value of the sensor repeats a small change across the boundary of the sections, the withdrawal processing may be delayed for a predetermined time. Thus, it is possible to reduce the traffic in the highly-frequent channel participation and withdrawal processing caused in the case where a measured value goes back and forth between the neighboring sections. Also, it is possible, at least, to maintain the state in which the sensor node is participating in the channel that requires participation.

When being instructed by a user's operation, for example, to search for the sensor node 100 with the measured vale of 20 Celsius, the retrieval node 120 specifies "ff15::5:104" which is the channel address associated with the section B2 (+19.5, +20.5) by referring to the address table stored in the table storage unit 121. The retrieval node 120 transmits inquiry data for the search to the channel address "ff15::5:104", and performs the search operation by receiving the response data for the inquiry data.

An example of the inquiry data for the search of the sensor node 100 with the measured value of 20 Celsius is the inquiry data shown in FIG. 8A.

FIG. 8 shows plural examples of the details of the inquiry data and the response data according to the first embodiment.

Note that the response data respectively shown in FIGS. 8A through 8D contains the details that correspond to the inquiry data shown in FIGS. 8A through 8D.

The data type "0x0001" representing that the data is inquiry data is stored in the inquiry data field shown in FIG. 8A, whereas "0x0011 is stored in the inquiry data ID field. In addition, the data type "0x0000" representing that the type is not specified is stored in the inquiry property field and the data type "0xFFFFFFFF" representing that there is no detail data is stored in the detail data field.

The inquiry generation unit 123 generates inquiry data shown in FIG. 8A, and the communication unit 125 transmits an UDP packet that includes the inquiry data to the channel address "ff15::5:104".

As a result of the multi-cast distribution on the IP network, the inquiry data arrives at all the sensor nodes 100 having the channel address "ff15::5:104" stored as a participation channel address, that is, all the sensor nodes 100 which are participating in the channel of the channel address "ff15::5:104", for each of which the response data is to be generated.

Figure 9:
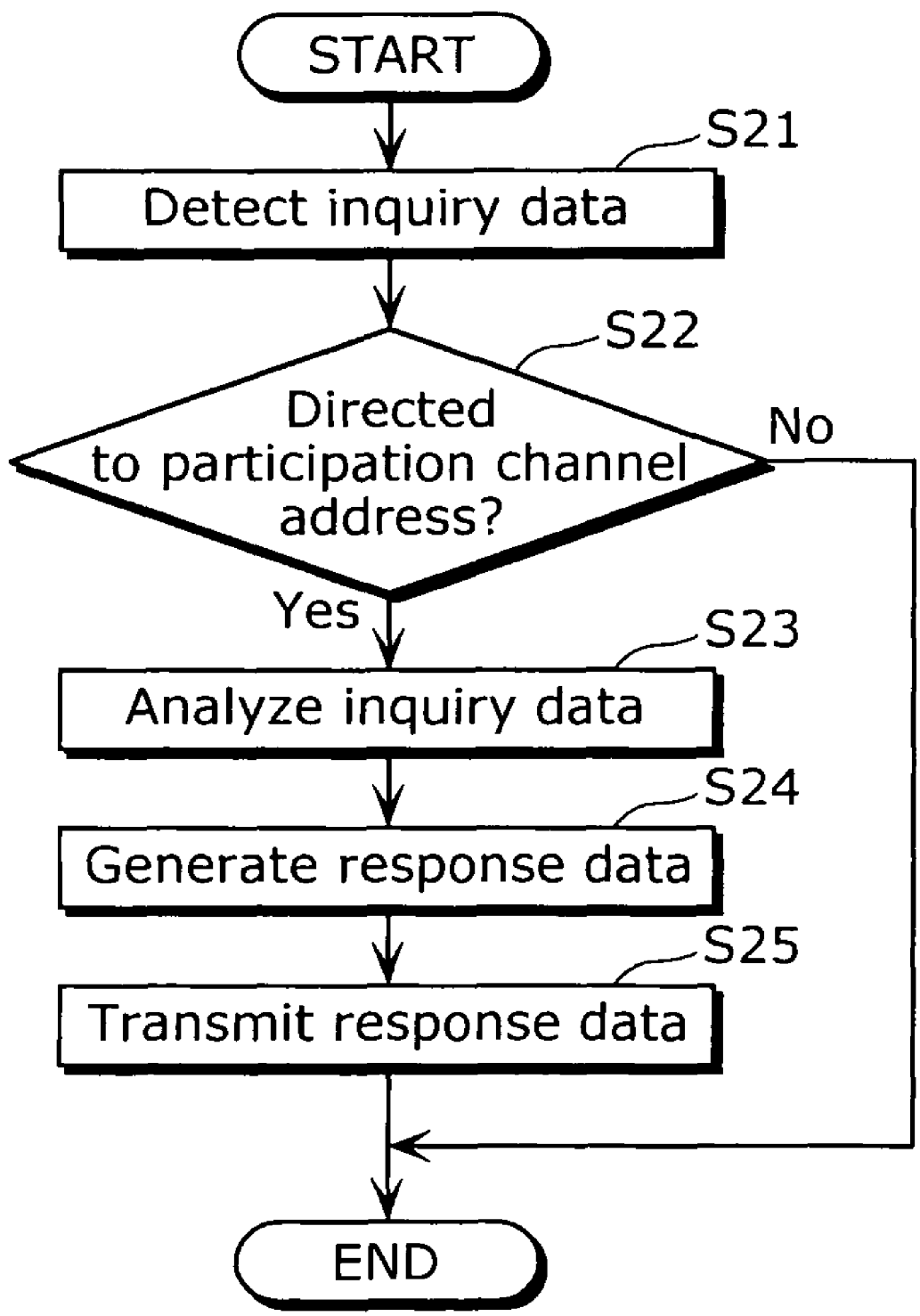
FIG. 9 is a flowchart showing the flow of the operation regarding the processing of the inquiry data performed in the sensor node according to the first embodiment of the present invention.

FIG. 9 is a flowchart showing the flow of the operation regarding the processing of the inquiry data in the sensor node 100 according to the first embodiment of the present invention.

The flow of the operation related to the processing of the inquiry data in the sensor node 100 will be described with reference to FIG. 9.

The communication unit 109 of the sensor node 100 detects the arrival of the inquiry data (S21), and notifies the judgment unit 108 of the destination address. The judgment unit 108 compares the destination address of the inquiry data and the participation channel address stored in the address storage unit 107. In the case where the addresses are the same (Yes in S22), the judgment unit 108 notifies the communication unit 109 of it. Having been notified that the destination address and the participation channel address are the same, the communication unit 109 passes the received inquiry data to the response generation unit 106.

The response generation unit 106 analyzes the inquiry data (S23). More precisely, the response generation unit 106 firstly refers to the data type within the inquiry data, and recognizes that the inquiry data is the data for an inquiry from the retrieval node 120.

Moreover, the inquiry property field being set as "not specified", the response generation unit 106 generates response data which simply echo backs the inquiry data ID (S24). The communication unit 109 transmits the generated response data after setting the address of the sensor node as the source of the transmission and the address of the retrieval node as the destination of the transmission (S25).

Note that when the result of the comparison between the destination address of the inquiry data and the participation channel address indicates that the addresses are not the same (No in S22), the result is notified to the communication unit 109 and the communication unit 109 terminates the operation regarding the inquiry data without passing that inquiry data to the response generation unit 106.

In other words, in the case where the sensor node 100 receives the inquiry data, only the inquiry data transmitted from the channel in which the sensor node 100 is presently participating is handled as the data to be actually processed by the sensor node 100.

The retrieval node 120 can receive, after a certain time, response data from all the sensors which are presently participating in the channel associated with the section B2 in the address table. The response processing unit 126 can also obtain the address of each sensor node by referring to the source address included in the IP header of such response data. Also, it is possible to examine whether or not the received detail is obtained as the result of the inquiry data, by checking the inquiry data ID that has been echoed back. The response processing unit 126 lists up the addresses, obtained from the response data, of the sensor nodes placed in the temperature between 19.5 and 20.5 Celsius, provides the user with the list as the search result, and completes a sequence of the search processing.

By previously storing, in the retrieval node 120, a correspondence list associating an address of a sensor node with a storage number of the storage in which the sensor node is placed, it is possible to provide the user with the storage numbers of each storage whose room temperature is maintained at approximately 20 Celsius, from the list of the addresses of the sensor nodes obtained as the search results.

Under the sensor network system of the present embodiment, it is possible not only to search for the sensor nodes 100 with the measured value of 20 Celsius, but also to examine, with one inquiry, the humidity of the place where the temperature is approximately 20 Celsius.

FIG. 8B is a diagram showing an example of the detail of the inquiry data in the case of inquiring each sensor node 100 of humidity, as well as an example of the detail of the response data for that inquiry data.

As shown in FIG. 8B, the value "0x0001" indicating a humidity property to be examined is specified as the inquiry property field of the inquiry data. Each of the sensor nodes which has received the inquiry data stores the humidity measured by the humidity sensor 104 into the detail data field within the response data, and returns it back.

For example, in the case of obtaining the humidity of the place with the temperature of approximately 20 Celsius, the retrieval node 120 transmits the inquiry data as shown in FIG. 8B to the channel address "ff15::5:104" associated with the section B2 (+19.5, +20.5) in the address table.

The inquiry data is received by all the sensor nodes 100 which are presently participating in the channel of the channel address "ff15::5:104", and is to be processed.

To be more precise, the response generation unit 106 detects that the value "0x0001" indicating a humidity property is stored in the inquiry property field within the inquiry data. The response generation unit 106 obtains the humidity as a measured value from the humidity sensor 104, and generates response data that includes the humidity in the detail data field.

As shown in FIG. 8B, in the response data, a value indicating that the humidity is 45%, for instance, is included in the detail data field. The retrieval node 120 can obtain the humidity in the place where the temperature is 20 Celsius by receiving such response data from all the sensor nodes 100 which are presently participating in the channel of the channel address "ff15::5:104".

The retrieval node 120 can also search for the sensor nodes 100 respectively having a measured value of 20 Celsius precisely, not the sensor nodes 100 respectively having a measured value of approximately 20 Celsius.

FIG. 8C shows an example of the detail of the inquiry data for retrieving the sensor nodes 100 having a measured value of "20 Celsius" exactly, as well as an example of the detail of the response data for that inquiry data.

As in the inquiry data shown in FIG. 8C, the retrieval node 120 stores the value "0x00000014" indicating "20 Celsius" into the detail data field, and transmits the value to the channel address "ff15::5:104" associated with the section B2 (+19.5, +20.5).

The sensor node 100 which is participating in that channel receives the inquiry data, and the response generation unit 106 obtains a measured value from the temperature sensor 103 and verifies whether or not the measured value is 20 Celsius.

In the case where the measured value is 20 Celsius, the response generation unit 106 generates response data having the value indicating that measured value stored in the detail data field. The generated response data is transmitted to the retrieval node by the communication unit 109. The response data shown in FIG. 8C shows the case where the measured value of the sensor node 100 is 20 Celsius and "0x00000014" indicating 20 Celsius is stored in the detail data field.

Note that even though the measured value does not match with the temperature to be searched for, response data may be transmitted as a reply as far as the measured value is within a predetermined range with respect to the temperature to be searched for. In this case, the inclusion of the measured value into the response data as described above is useful for the retrieval node 120's side to know an actual measured value.

The response data may include the temperature or the humidity which is a measured value, irrespective of the detail of the inquiry data. For example, the response data shown in FIG. 8C may be transmitted in response to the inquiry data shown in FIG. 8A.

Thus, by the fact that the sensor node 100 transmits the response data which includes the measured value obtained from the sensor, the retrieval node 120 can obtain various measured values from the sensor nodes at the same time when a search on sensor nodes 100 is made, and the obtained values can be used in the data processing for providing the user with the search result, or the like.

The information regarding the measurement value associated with the channel used for the transmission may be stored into the inquiry data and the response data.

FIG. 8D shows an example of the inquiry data and the response data, in each of which the information regarding the measurement value associated with the channel used in the transmission is stored.

As described above, the retrieval node 120 and the sensor node 100 have the same address table, but the tables are placed independently from each other. Therefore, in some cases, the address table may be changed individually.

Therefore, in order for the retrieval node 120 to grasp the change status of the address table of the sensor node 100, for example, or in order for both the retrieval node 120 and the sensor node 100 to update its own address table, it is useful for the retrieval node 120 and the sensor node 100 to notify each other of the information regarding the address table.

For example, assume here that the address table stored in the table storage unit 101 of the sensor node 100 is changed, and the measurement value associated with the channel address "ff15::5:104" is changed from (+19.5, +20.5) to (+18.5, +20.5).

The inquiry data shown in FIG. 8D is the inquiry data transmitted to the channel address "ff15::5:104" associated with the section B2 (+19.5, +20.5) of the address table shown in FIG. 4. Therefore, "0x19502050" indicating the section B2 (+19.5, +20.5) is stored in the detail data field.

The sensor node 100 which is presently participating in the channel with the channel address "ff15::5:104" receives the inquiry data. After the reception of the inquiry data, the response generation unit 106 obtains, from the address table, the section (+18.5, +20.5) associated with that channel, and generates response data which includes "0x18502050" indicating that section into the detail data field.

The retrieval node 120 receives the inquiry data, and checks the detail data field to know the range of the measured value indicating the temperature obtained by the sensor node 100 which has responded back. This information can be used, for example, for the notification of the search result to the user or the upper system.

The sensor node 100 may use the section (+19.5, +20.5) notified by the retrieval node 120. For example, in the address table, the section associated with the channel may be updated to the notified section.

Note that, in the present embodiment, a sensor network utilizing an IPv6 network 111 is used for the network between the sensor node 100 and the retrieval node 120. However, another type of network which allows multi-cast communication may be used instead, and the network only needs to have plural channels for communication.

For example, a communication network (hereinafter to be referred to as "P2P network") for Peer-to-Peer (P2P) communication through which the terminals connected to the network directly perform communication may be used. Note that a terminal which performs communication via the P2P network is called "peer".

The P2P network can be realized by an overlay network having original architecture and communication protocol as well as an address system. With the application of the P2P network to the embodiment, the sensor node 100 and the retrieval node 120 function as peers.

Each peer on the P2P network combines with a peer of the same type depending on a property and policy possessed by the peer, and configures a partial network called "peer group". The network functions so that the communication data directed to the peer group is delivered only to the peer which belongs to the same peer group.

The existing P2P network, in many cases, is implemented as an overlay network which has a TCP/IP as a transport, and the P2P network is implemented in such a manner that the communication data directed to the peer group in the upper layer is mapped onto the multi-cast communication provided by a network layer or a transport layer of the lower layer.

In the case of the P2P network which operates on a Non-Broadcast Multiple Access (NBMA), e.g., an Asynchronous Transfer Mode (ATM), the mapping is performed onto the point-to-multipoint communication in the lower layers, but with the peer-group-directed P2P multi-cast channel supported by the upper layers, the present invention is applicable.

FIG. 10 shows an example of the data structure of the address table in the case of using a P2P network as the network between the sensor node 100 and the retrieval node 120.

A unique peer ID is assigned, on the sensor network, to each peer which is a component node of the P2P network, and functions as a logic address on the overlay network. In the present example, Universally Unique Identifier (UUID) of 64 bits, which is generated based on a data link address at the time when each peer is activated, is used. In the P2P network, each of the peers as described above forms a peer group depending on its features, in which the peers can configure the P2P network closed within the group, as well as share information.

In each peer, a peer that functions as a bind point is present, and the participation to and withdrawal from the peer group is performed by such a peer as a bind point serving as a central point. On the P2P network, different peer groups are structure for each division section of the temperature axis, and a peer ID of the peer serving as a bind point is stored as a channel address for the communication with a peer group associated with each section in the address table shown in FIG. 10.

For example, in the case where the retrieval node 120 transmits the inquiry data to the sensor node 100 with the measured value of "20 Celsius", the inquiry data should be transmitted to the peer ID "uuid-66E512FF790EA1E6" of the peer as the bind point.

Also, in the address table respectively shown in FIGS. 4 and 10, a measured value of the temperature sensor 103 is associated with the channel address, by dividing the range of the measurement value obtainable by the temperature sensor 103 into plural sections.

However, in the address table, the channel address may be associated with a value or a character string, instead of a section having a predetermined width.

For example, in the case where the information obtained by the sensor as a measured value is limited to an integer value, one channel may be associated with one integer.

In short, it is with one of a measurement value obtainable by the sensor and a channel address that the other needs to be identified. The relationship may be either one-to-many or many-to-one.

Also, in the address table respectively shown in FIGS. 4 and 10, a measurement value obtainable by the temperature sensor 103 is associated with a channel address, but a measurement value obtainable by the humidity sensor 104 may be associated with a channel address.

In this case, the retrieval node 120 can obtain, with one inquiry, the respective temperatures from the sensor nodes 100 set in the place where the humidity is around 50%, for instance. That is to say that the temperature of the place in which the humidity is around 50% can be obtained.

Also, in the embodiment, the temperature sensor 103 and the humidity sensor 104 are taken as the examples of the sensors equipped in the sensor node 100, but sensors other than these may be set instead. The number of sensors may be one or plural. The objects to be measured by the sensors may not be the conditions outside the sensor node 100, but may be the temperature inside the sensor node 100 or the communication status of the sensor node 100, or the like.

It is described that the sensor node 100 and the retrieval node 120 have the same address table, however, they may have different address tables. For example, with the address table of the retrieval node 120 being included in the address table of the sensor node 100, the sensor node 100 can at least judge correctly whether or not the inquiry data transmitted from the retrieval node 120 is directed to the channel address in which the sensor node 100 is presently participating.

It is also described that, in the sensor network according to the embodiment, plural sensor nodes 100 are connected to the IPv6 network 111. However, the sensor nodes connected to the IPv6 network 111 do not need to be the same, and the sensor nodes of different functions may be mixed. Each of the sensor nodes needs to have an address table in which the channel address of the channel in which the sensor node per se participates, while the retrieval node needs to have an address table in which the channel address of the channel in which the sensor node to be searched for participates.

Also, it is described that, in the sensor network according to the embodiment, the sensor node 100 requests to the router 110 for participation in and withdrawal from a channel. However, even in the network configuration without the router 110, it is possible to conduct an efficient search on the sensor nodes 100 using the sensor node 100 and the retrieval node 120.

For example, the case of using the a closed network configured of one or more sensor nodes 100 and one or more retrieval nodes 120 is assumed. In each sensor node 100, the channel address stored in the address storage unit is updated according to a measured value of the temperature regularly obtained by the temperature sensor 103.

The retrieval node 120 transmits inquiry data to the channel address that meets a search condition, in accordance with an instruction from the user or the upper system.

The inquiry data transmitted from the retrieval node 120 arrives at all the sensor nodes 100 on the network. In other words, this is the same as in the case where the inquiry data is broadcast. However, in each sensor node 100, filtering is performed for the arrived inquiry data, and only the inquiry data directed to the participation channel address is to be processed for the generation and transmission of the response data. That is to say that only the sensor node 100 which meets the search condition performs the generation and transmission of the response data.

In this way, even in the sensor network which does not require the router 110, the retrieval node 120 can receive a response only from a sensor node 100 which meets the search condition, without inquiring each sensor node 100, and list up the responses. The sensor node 100 analyzes only the inquiry data directed to the channel in which a sensor node 100 participates, and does not perform any unnecessary processing onto the inquiry data which does not need to be responded.

Namely, even in the sensor network that does not require the router 110, it is possible for the sensor node 100 to conduct an efficient search based on dynamic property, using the functions respectively equipped in the sensor node 100 and the retrieval node 120.

Thus, according to the present embodiment, a sensor node and a retrieval node are connected via a communication network in which the communication can be performed with plural channels such as an IPv6 network and a P2P network. Also, by using, as a channel address, an IP multi-cast address or a peer ID of a bind point in the P2P communication, it is possible to list up only the sensor nodes which meet a search condition that includes the information indicating a measurement value, without managing the operation of the database of measured values and without making an inquiry to each sensor node. In other words, it is possible to conduct a search based on dynamic property.

Also, since a channel address is updated, in a sensor node, according to a measured value, a retrieval node can obtain an appropriate search result in accordance with each search condition even in the case where a search condition is changed in various ways within the range of the measurement value obtainable by the sensor node.

Also, in the case of newly connecting a sensor node to the network, a setting for a retrieval node is unnecessary. That is to say that it is possible to realize an open sensor network with high extensibility.

Note that a search across the sensor networks of different network address allocation policies can be transparently carried out by the relay device according to the present invention. Such an embodiment will be mentioned later as the third embodiment.

Second Embodiment

The following describes an example of the sensor network for use in a physical distribution management system which uses wireless tags on which individual identification numbers are recorded. The wireless tags are tiny wireless IC chips to be used for the identification of the objects, and are also called "IC tags", "RF tags", and the like. A wireless tag has identification information of its own recorded and is capable of sending and receiving the information to and from the management system using electric waves.

The individual identification number of the wireless tag is identification information in accordance with the number system in which the uniqueness of the identification numbers is assured on a specific domain, as described above. An EPC to be used for RFID, or the like, can be raised as an example of such information.

The RFID is an individual identification number in a global domain which assures uniqueness. In the EPC, a number system management organization for the assurance of uniqueness exists, and the operation is carried out to assign a manufacturer ID for each manufacturer without assigning the same manufacturer ID to different manufacturers.

Figure 11:
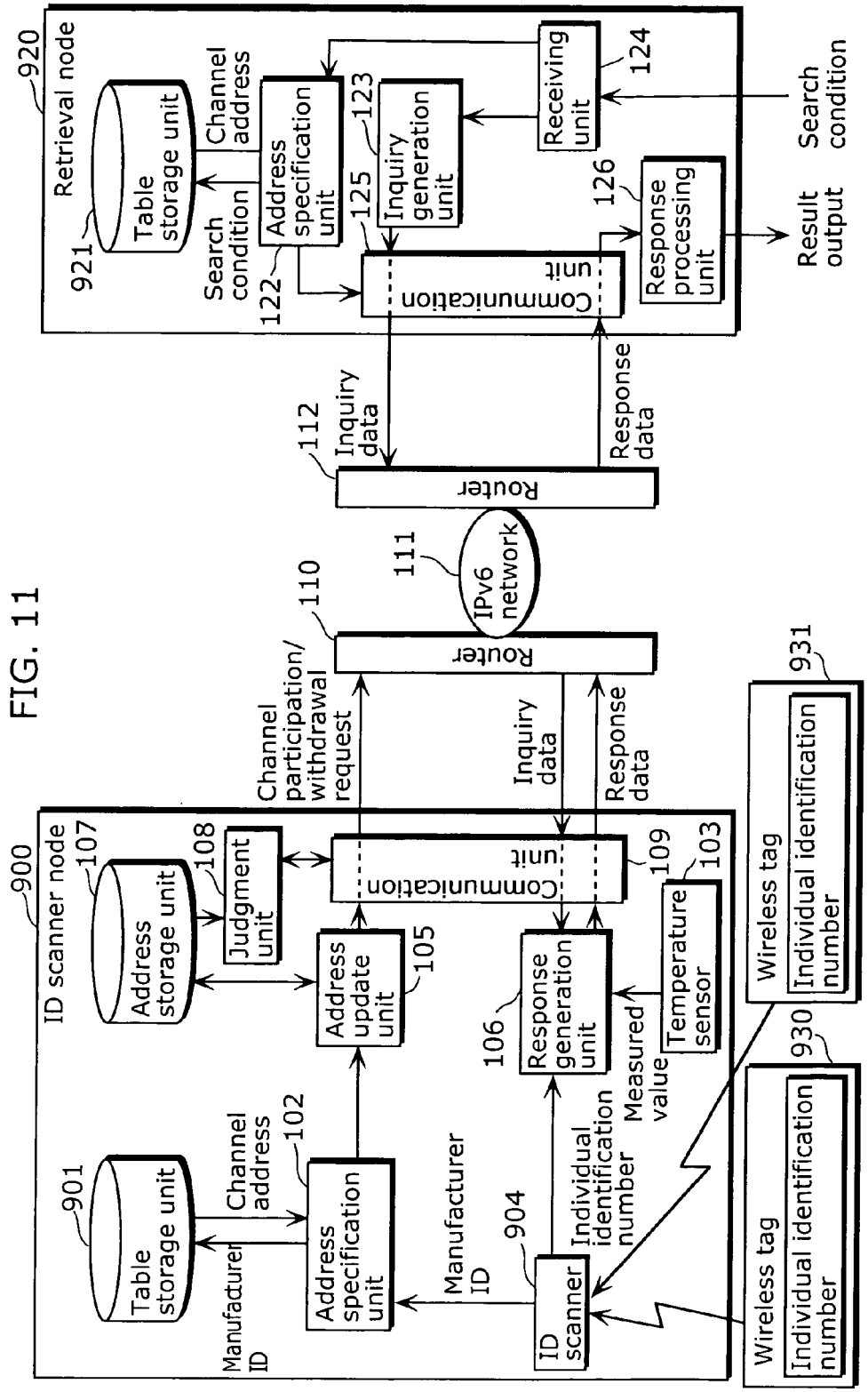
FIG. 11 is a functional block diagram showing functional configurations of the ID scanner node and the retrieval node according to a second embodiment of the present invention.

FIG. 11 is a functional block diagram showing functional configurations of an ID scanner node and a retrieval node according to the second embodiment. Note that the descriptions of the same configuration and operation as the first embodiment are omitted, and the components characteristic to the second embodiment will be focused.

The case of using an IPv6 network 111 as is the case of the first embodiment as a network between a retrieval node 920 including a table storage unit 921 and an ID scanner node 900 including a table storage unit 901 is described.

The ID scanner node 900 is another example of the sensor device according to the present invention, and is equipped with an ID scanner 904 as a measuring means. The ID scanner 904 can measure an individual identification number of a wireless tag that is present within a predetermined range from the ID scanner 904. That is to say that the ID scanner 904 is an example of the measurement unit which obtains, as a measured value, identification information included in a wireless tag by reading the identification information via a wireless communication.

FIG. 12 is an example of the data structure of the individual identification number according to the second embodiment.

As shown in FIG. 12, the individual identification number according to the second embodiment is made up of: a version field which specifies a format of the individual identification number; a manufacturer ID field in which uniqueness is assured by a management organization on a global domain; a product ID field in which uniqueness is assured on each manufacturer's domain; and an individual ID field in which uniqueness is assured on each product-typed domain. That is to say that a wireless tag 930 and a wireless tag 931 shown in FIG. 11 have individual information numbers which are different from each other.

A wireless tag with the individual identification number having such a data structure is attached to a distributed product to be managed, and the distributed product attached with a wireless tag is stored in a container which is a storage place. Also, the ID scanner node 900 is placed in each container. The individual identification number is read out by the ID scanner 904 of the ID scanner node 900 placed in each container, in a non-contact manner via a wireless communication.

In the case of an UHF band RFID tag (passive), a distance that allows the communication between the ID scanner 904 and the wireless tag is within the range of 3 to 5 meters, however, the distance needs to be long enough for the ID scanner 904 to be able to read the information (individual identification number) in the wireless tag.

Each distributed product is carried into a container and carried out of the container during the process of distribution. Namely, the product is transported from one container to another. This is why the individual identification number to be scanned by the ID scanner node 900 placed in each container is a dynamic property which changes with time.

With the sensor network according to the present embodiment, in the situation, for example, where the products manufactured by three companies A, B and C are stored in plural containers, it is possible to search individual container in which the respective products are stored.

The retrieval node 920 and the ID scanner node 900 have the same address table. The method for assuring that the retrieval node and the ID scanner node have the same address is the same as used in the first embodiment, therefore, the descriptions are omitted. An example of the address table used in the present embodiment is shown in FIG. 13.

FIG. 13 is a diagram showing an example of the data structure of the address table according to the second embodiment.

As shown in FIG. 13, in the address table according to the second embodiment, three manufacturer IDs are stored as measurement values obtainable from the ID scanner 904. These three manufacturer IDs respectively correspond to the companies A, B and C in a descending order.

An IP multi-cast address is associated with each manufacturer ID, as a channel address.

The ID scanner node 900 regularly scans inside the container so as to collect each individual identification number of a wireless tag attached to a product of each manufacturer which is stored in the container. The address specification unit 102 specifies a channel address of the channel in which the ID scanner node 900 should participate, based on the measured values that can be obtained from each ID scanner 904, that is, an individual identification number and an address table stored in the table storage unit 901. The address update unit 105 updates the participation channel address to the specified channel address.

For example, in the case where the wireless tag 930 is attached to a product of the company A, and the manufacturer ID "0x3000000" of the company A is given as a measured value, the participation in the channel that applies to A in the address table is processed. In the case of not being able to obtain the manufacturer ID "0x3000000" as a measured value, the withdrawal from the channel associated with the company A in the address table is processed. The same applies to the companies B and C.

Note that in the case of measuring a manufacturer ID of various types with one inquiry, plural channel addresses corresponding to the manufacturer IDs are stored in the address storage unit 107.

The retrieval node 920 can, for example, obtain response data from the ID scanner node 900 placed in a container which stores the products manufactured by the company A, by transmitting inquiry data to the channel address corresponding to the company A, namely, to the channel address "ff15::2:100".

The procedure used in sending inquiry and receiving response data in the retrieval node 920 according to the second embodiment is the same as in the first embodiment. The retrieval node 920 according to the second embodiment can examine, with one inquiry, a temperature, a humidity, or the like, in the container which stores the products manufactured by the company A, by using the same inquiry data as the one shown in FIG. 8B, as is the case where the retrieval node 120 according to the first embodiment can examine, with one inquiry, the humidity in the place with a specific temperature.

For example, in the case of examining the temperature in the container which stores the products of the company A, the inquiry generation unit 123 of the retrieval node 920 generates inquiry data which stores, into an inquiry property field, "0x0002" indicating a temperature property. The generated inquiry data is transmitted by the communication unit 125 to the channel address "ff15::2:100" associated with the company A.

The ID scanner node 900 receives the inquiry data, and the inquiry data is judged, by the judgment unit 108, to be transmitted using the channel in which the ID scanner node 900 is presently participating.

The response generation unit 106 recognizes that "0x0002" indicating a temperature property is specified in the inquiry data ID field within the inquiry data. After the recognition, the response generation unit 106 generates the response data in which the container temperature obtained by the temperature sensor 103 is stored in the detail data field. The generated response data is transmitted by the communication unit 109 to the retrieval node 920.

In this way, the retrieval node 920 can obtain, with one inquiry, the temperature inside the container which stores the products of the company A.

Using the inquiry data shown in FIG. 8C, the retrieval node 920 can also receive response data exclusively from the ID scanner node 900 with a measured value of "20 Celsius", for example, inside the container which stores the products of the company A.

In this case, the ID scanner node 900 recognizes that a value indicating a temperature property is stored into the inquiry property field within the inquiry data, and a temperature to be searched for is stored into the detail data field. After the recognition, the ID scanner node 900 obtains the container temperature from the temperature sensor 103, and returns response data only in the case where the obtained temperature is the temperature to be searched for. Note that the response data may be transmitted as a reply only in the case where the measured value does not correspond to the temperature to be searched for, but indicates the temperature within a predetermine range from the temperature to be searched for.

Also, the retrieval node 920 can obtain, from the collected response data, the address information of the ID scanner node 900 which is a transmission source. Therefore, in the case where the ID scanner node 900 and the container number are stored in a correspondence chart on the side of the retrieval node 920, it is possible to specify a container group which satisfies a search condition, by referring to the correspondence chart.

Thus, in the sensor network according to the present embodiment, the ID scanner node 900 placed in a container can obtain, as a measured value, an individual identification number which is assigned to a product in the container and is a dynamic property.

Also, the retrieval node 920 can conduct a search using the information included in the individual identification number. The address table which associates such information and a channel address is used for the search, and an effective and flexible search can be carried out based on dynamic property, requiring neither a database of measured values nor making an inquiry to each ID scanner node.

Such an efficient search method is effective also as a container searching means in the physical distribution management system providing different temperature management conditions depending on a manufacturer.

Note that, in the address table shown in FIG. 13, the information associated with a channel address may not be the information indicating a manufacturer, but may be a product ID, for instance. In short, the information obtainable from a measurement unit, e.g., the ID scanner 904 equipped in the ID scanner node 900 may be used.

As is the case of the first embodiment, in the case of using a communication network, e.g., a P2P network instead of an IPv6 network 111, a function of efficiently and flexibly carrying out a search based on dynamic property, which is the feature of the present invention, cannot be impaired.

Third Embodiment

The following describes, as the third embodiment of the present invention, an embodiment which enables a search across the sensor networks having the network address allocation policies which are different from each other.

Figure 14:
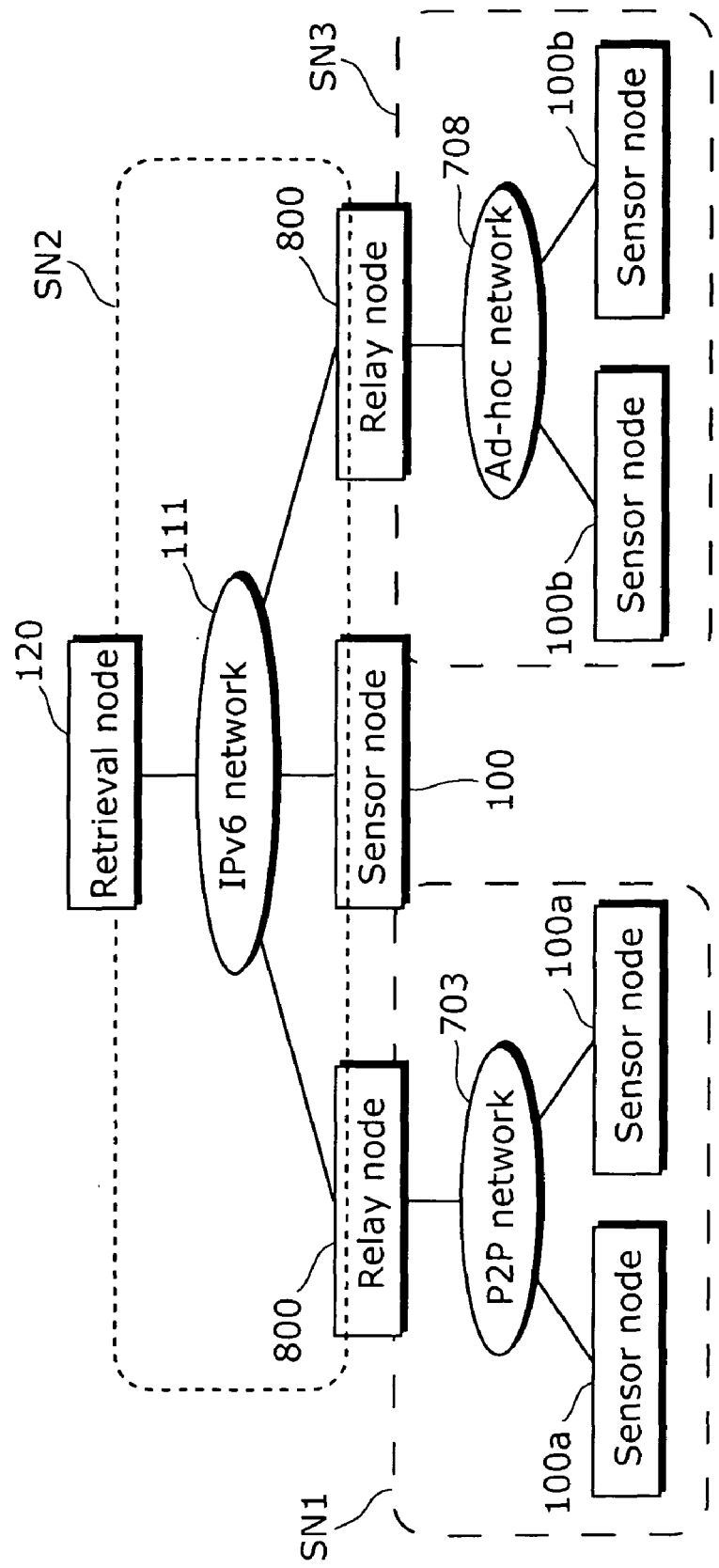
FIG. 14 is a diagram showing an outline configuration of the sensor network according to a third embodiment.

FIG. 14 is a diagram showing an outline configuration of the sensor network according to the third embodiment.

The sensor network according to the third embodiment has the configuration in which a sensor network (SN2) on the IPv6 network 111, a sensor network (SN1) on a P2P network 703 and a sensor network (SN3) on an ad-hoc network 708 are respectively connected via a relay node 800. Note that the SN1 and SN2 are the examples of the first network and the second network in the relay device according to the present invention.

The sensor node 100 and the retrieval node 120 described in the first embodiment are connected to the SN2, and sensor nodes 100a and 100b having the same configuration as the sensor node 100 are respectively connected to the SN1 and the SN3.

On the SN2, the address table, as shown in FIG. 4, for which an IP multi-cast address is used as a channel address is used. Also on the SN1, the address table, as shown in FIG. 11, for which a peer ID of a bind point is used as a channel address is used.

The relay node 800 is an example of the relay device according to the present invention, and is a device which relays inquiry data between different tables. With the use of the relay node 800, it is possible to carry out a transparent search processing between the sensor networks to which different network policies are applied.

Figure 15:
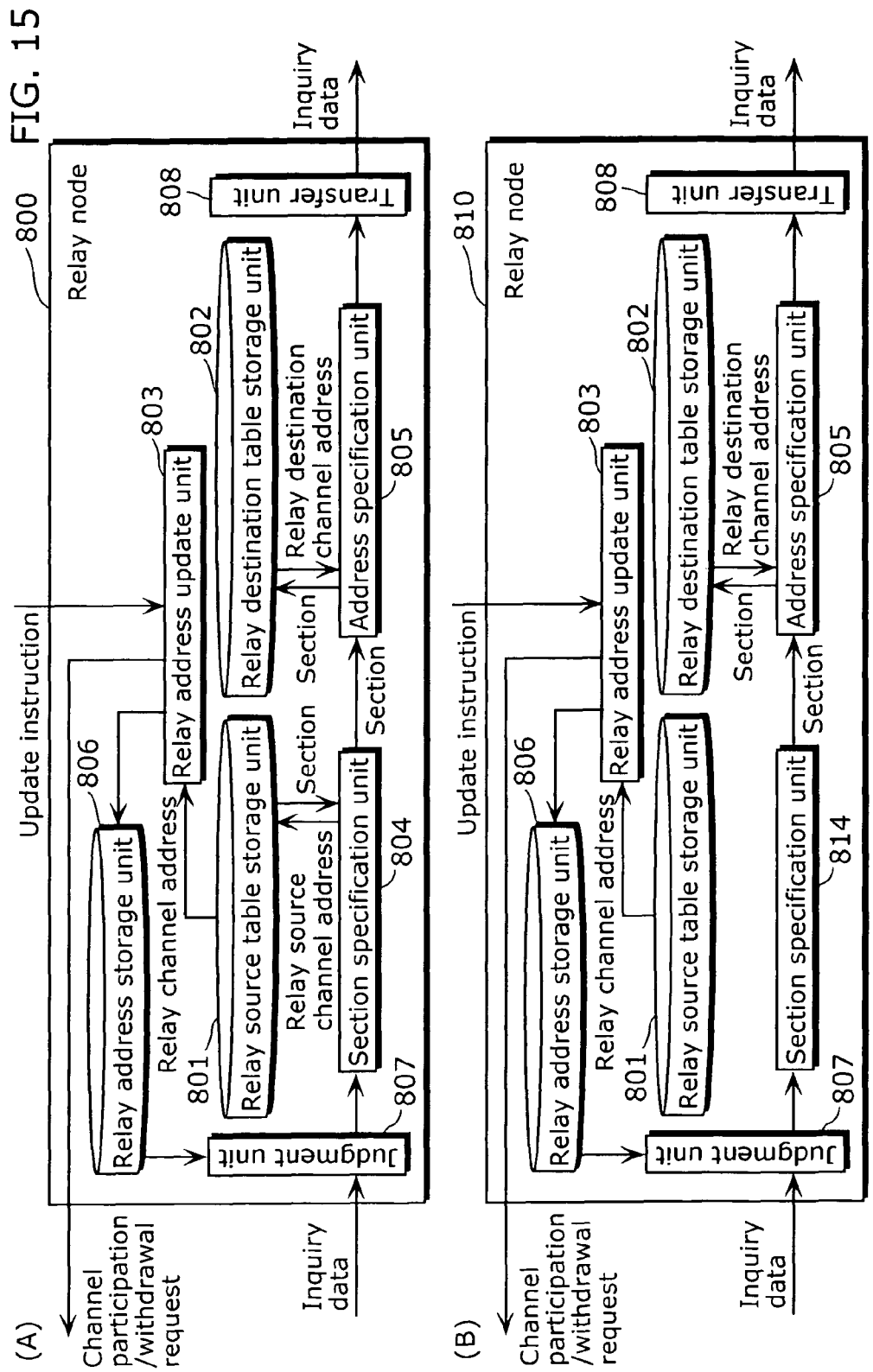
FIGS. 15A and 15B are functional block diagrams respectively showing a functional configuration of the relay device according to the third embodiment of the present invention.

FIG. 15 is a functional block diagram showing a functional configuration of the relay device according to the third embodiment.

The relay node 800 shown in FIG. 15A is configured for the case where the inquiry data transmitted from the retrieval node 120 does not include the information indicating a section associated with the destination channel of the inquiry data. The relay node 810 shown in FIG. 15B is configured for the case where the inquiry data transmitted from the retrieval node 120 includes the information indicating the section, as shown in FIG. 8D.

The relay node 800 shown in FIG. 15A is configured of: a judgment unit 807 which judges whether or not the transmitted inquiry data is from the channel in which the relay node 800 is presently participating; a relay source table storage unit 801 which stores a relay source address table that is an address table of the network serving as a relay source; a relay destination table storage unit 802 which stores a relay destination address table that is an address table of the network serving as a relay destination; a relay address update unit 803 which performs participation in all the channels, on the SN2, which require relay, as well as performs withdrawal from the channel, on the SN2, which no longer needs relay; a relay address storage unit 806 which stores a channel address of the channel, on the SN2, in which the relay node 800 is presently participating; a section specification unit 804 which specifies a section, on the relay source address table, which is associated with the inquiry data, by conducting a reverse search in a relay source address table based on the destination channel address of the inquiry data received from the channel in which the relay node 800 is presently participating; a relay destination specification unit 805 (Address Specification Unit) which searches a relay destination address table using the specified section, and specifies the channel address of the relay destination network of the section; and a transfer unit 808 which transmits inquiry data to the relay destination network.

The relay node 810 shown in FIG. 15B is configured to have a section specification unit 814 instead of the section specification unit 804 of the relay node 800 as described above. The relay node 810 is configured for the case where the inquiry data includes the information indicating the section, and there is no need to conduct a reverse search in a relay source address table. Therefore, the section specification unit 814 specifies a section based on the detail data field of the received inquiry data, and sends the specified section to the relay source specification unit 805 (Address Specification Unit). The other components and the operations thereof are as same as those of the relay node 800.

Note that the respective section specification units 804 and 814 are the examples of a measurement value specification unit in the relay device according to the present invention.

The relay node 800 performs participation in all the channels that require relay among the channels of the channel address described in the relay source address table by the relay address update unit 803, as well as withdrawal from the channel of the channel address which no longer requires relay.

The section specification unit 804 specifies the section associated with the channel address which is set as a destination, by conducting a reverse search in the relay source address table based on the channel address that is the destination of the received inquiry data. Moreover, the relay destination specification unit 805 searches the relay destination address table based on the information regarding the specified section, specifies the channel address to be relayed, and transmits inquiry data.

In this way, association of the channel address is carried out between the different address tables in the relay node 800.

Note that the relay node 810, as described above, specifies a section from the detail data field of the inquiry data received by the section specification unit 814, and sends the specified section to the relay destination specification unit 805. The operation thereafter is the same as that of the relay node 800.

The following describes in detail the relay node 800 which relays between the SN2 that is a sensor network on the IPv6 network 111, and the SN1 that is a sensor network on the P2P network.

The relay node 800 stores the two address tables respectively shown in FIGS. 4 and 11 into the relay source table storage unit 801 and the relay destination table storage unit 802. With the use of the two address tables, the relay node 800 appropriately relays the inquiry data received from the retrieval node 120 on the SN2 side to the SN1 side.

Therefore, the relay node 800 needs to receive the inquiry data transmitted from the retrieval node 120 and analyze the inquiry data or the like. The relay node 800 then performs participation in all the channels of the channel address which needs relay among the channel addresses described in the relay source address table, as well as withdrawal from the channel of the channel address which no longer needs relay. Whether or not the channels require relay is determined by relay policies, and the determination may be set in a relay node. In the case of needing update, an instruction may be given to the relay address update unit 803 either directly or via a network. Moreover, the instruction may be given by the retrieval node 120.

Figure 16:
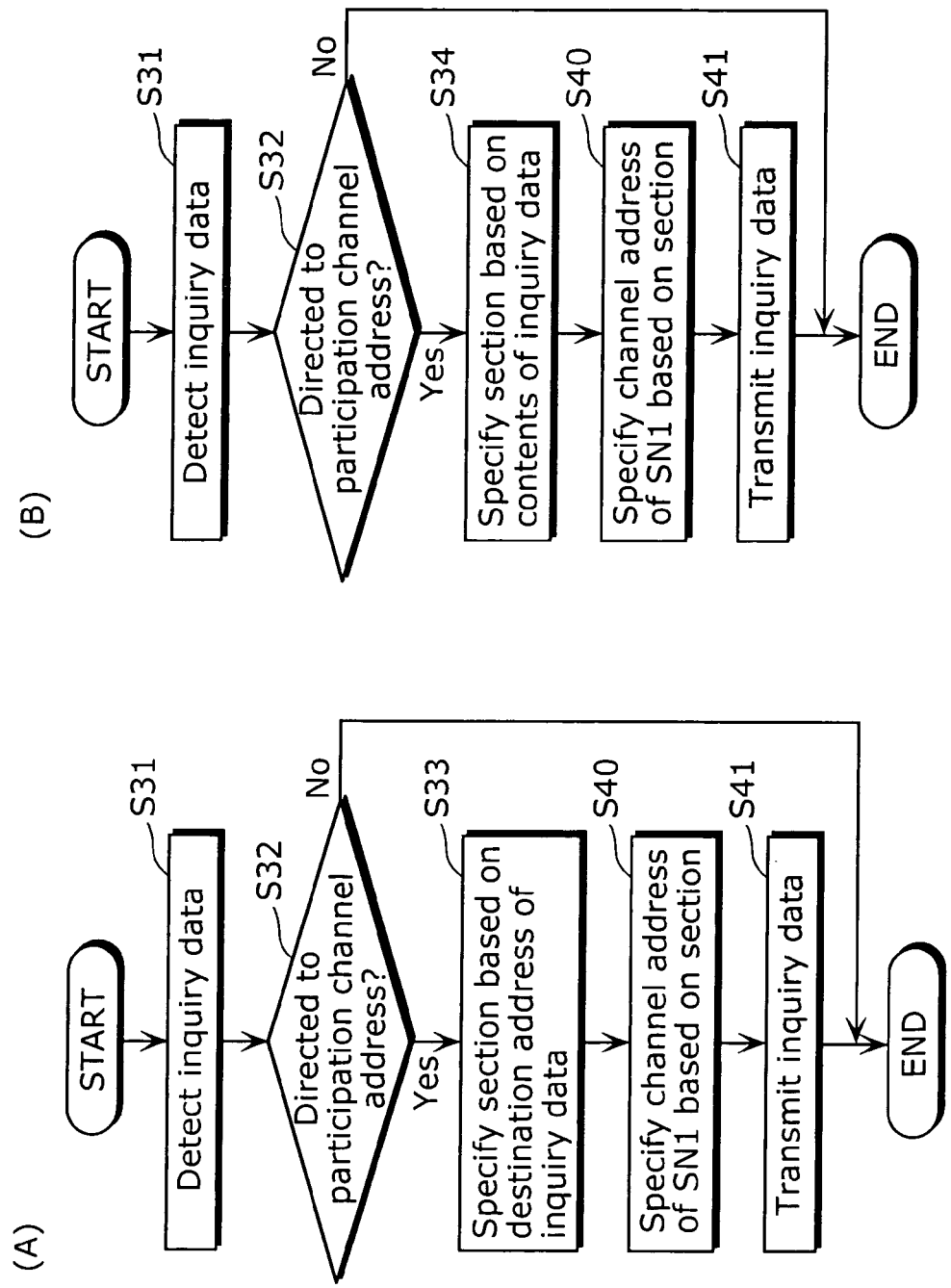
FIGS. 16A and 16B are flowchart showing the flow of the operation regarding the relay of the inquiry data in the relay node according to the third embodiment of the present invention.

FIG. 16 is a flowchart showing a flow of the operation regarding a relay of inquiry data in the relay node according to the third embodiment.

FIG. 16A is a flowchart showing a flow of the operation regarding the relay of the inquiry data carried out in the relay node 800 shown in FIG. 15A.

Using the flowchart shown in FIG. 16A, the flow of the operation regarding the relay of the inquiry data performed in the relay node 800.

Having detected an arrival of the inquiry data (S31), the judgment unit 807 of the relay node 800 compares the destination address of the inquiry data and a participation channel stored in the relay address storage unit 806. In the case where they match with each other as a result of the comparison, the judgment unit 807 judges that the inquiry data is directed to the participation channel address (Yes in S32), and passes the inquiry data to the section specification unit 804.

Note that in the case where they do not match with each other as a result of the comparison, the inquiry data is judged as not directed to the participation channel (No in S32), and the operation regarding the relay of the inquiry data is terminated.

The section specification unit 804 conducts a reverse search in the relay source address table stored in the relay source table storage unit 801 based on the destination channel address of the inquiry data, and specifies the corresponding section (S33).

The information indicating the specified section is sent together with the inquiry data to the relay source specification unit 805. The relay destination specification unit 805 searches the relay destination address table stored in the relay destination table storage unit 802, using the information indicating the received section, and specifies the channel address, on the SN1, which is associated with that section (S40).

The transfer unit 808 transmits the inquiry data to the channel address on the SN1, which is specified by the relay destination specification unit 805 (S41).

FIG. 16B is a flowchart showing the operation regarding the relay of the inquiry data performed in the relay node 810 shown in FIG. 15B.

Compared to the operation of the relay node 800 shown in FIG. 16A, the operation regarding the relay of the inquiry data performed in the relay node 810 is different only in that the section specification unit 814 specifies the section which corresponds to the inquiry data by referring to the detail field within the inquiry data (S34).

In other words, even with the relay node 810, the destination of the inquiry data is converted into the channel address, on the SN1, which corresponds to the inquiry data, and is to be properly relayed.

The inquiry data relayed to the SN1 side is routed to the sensor node 100a through the peer group of the inquiry data.

As an example of the relay, the case of transmitting the inquiry data shown in FIG. 8C from the retrieval node 120 is described. Note that the retrieval node 120 is assumed to be already participating in the channel of the channel address "ff15::5:104" on the SN2.

With "20 Celsius" specified as a search condition by the user, the retrieval node 120 refers to the address table shown in FIG. 4, and obtains the channel address "ff15::5:104" associated with "20 Celsius", as the address of the destination of the transmission of the inquiry data. The retrieval node 120 then transmits the inquiry data to that channel address.

Having received the inquiry data, the relay node 800 verifies that the inquiry data is transmitted from the channel in which the relay node 800 is presently participating. After the verification, the section specification unit 814 specifies the section B2 (+19.5, +20.5) associated with the channel address "ff15::5:104", by conducting a reverse search in the address table shown in FIG. 4.

The relay destination specification unit 805 specifies "uuid-66E512FF790EA1E6" as an appropriate peer group of a bind point on the SN1 side based on the specified section B2 (+19.5, +20.5) with reference to the address table shown in FIG. 5. The transfer unit 808 transmits the inquiry data to the bind point.

The inquiry data received by the bind point on the SN1 is processed by the sensor node 100*a* within the peer group of that bind point, and the response data is transmitted as a reply to the retrieval node 120.

Thus, even the search across the sensor networks having different network address allocation policies can be transparently executed by the relay node 800. That is to say that the retrieval node 120 and the sensor node 100 do not have to mind about which network a partner node is connected to, and do not need to perform processing for making up the difference in the address table due to the different network. Also, it is obvious that the effect is not lost even in the case of using the relay node 810.

The present embodiment is, as described above, an embodiment which performs communication between the sensor networks having different network address allocation policies. Therefore, it is conceivable that measurement values and sections are different between the address tables.

In this case, as described in the first embodiment, by interchanging the information regarding the section on the address table actually used in the respective networks through the transmission of the inquiry data and the response data as shown in FIG. 8D, it is possible to inform the user, who has instructed the search, of the information.

Note that the SN3 is a narrow-area sensor network comprised of an ad-hoc network 708, and can communicate with the SN2 via the relay node 800.

In the ad-hoc network, only a uni-cast communication is supported, and in some cases, it is not possible to form an address table in which the measurement values obtainable by the sensor node 100*b* are associated with channel addresses.

However, in the case of the narrow-area ad-hoc network which does not require expansion, with the structure in which an all node search is carried out using uni-cast communication, on the SN3, and the relay node 800 relays the result to the retrieval node 120, it is possible to search for the sensor node 100*b* on the SN3 using the retrieval node 120 on the SN2.

In this case, the relay node 800 which relays the communication between the SN2 and SN3 does not need to be equipped with a relay destination address table. The relay node 800 only needs to transfer the inquiry data transmitted from the retrieval node 120 to each of the sensor nodes on the SN3.

The present embodiment defines that the retrieval node 120 is connected to the SN2 on the IPv6 network 111 and searches the sensor nodes 100*a* on the SN1. However, the retrieval node 120 may be connected to the SN1 and may search the sensor nodes 100 on the SN2. In such a case, the relay node 800, which relays the communication between the SN2 and the SN1, can properly transmit the inquiry data transmitted from the SN1 to the SN2, by exchanging the relay source address table and the relay destination address table.

The object to be searched is assumed to be sensor nodes having the same configuration as the sensor node 100. However, a sensor device with a different configuration may be used instead. For example, the ID scanner node 900 of the second embodiment may be used. In other words, the features of the present invention shall not be impaired depending on an object to be measured by a sensor node or a type of measured value.

The present invention is applicable to a system which conducts a search based on dynamic property in a sensor network to which one or more sensors are connected via a network. The invention is suitable for the wide range of fields including: a wide-area sensor network which places importance on scalability of a condition management, for example, of a food product or a chemical substance, a distribution management, a natural environment monitoring such as climate and temperature, and a survey in the event of a natural disaster; a narrow-area sensor network as applied to office and home uses; and a sensor network in which positional information of a moving object changes.

The invention claimed is:

1. A sensor device which communicates with another device via a network having a plurality of channels for communication, each of the plurality of channels being associated with a respective channel address of a plurality of channel addresses, said sensor device comprising:
   an address storage unit storing a channel address to be used for the communication with the other device;
   a measurement unit measuring a surrounding status a plurality of times at a predetermined interval, and obtaining a newly measured value each of the plurality of times the surrounding status is measured;
   a table storage unit storing an address table including a plurality of sections, each of the plurality of sections being associated with at least one separate previously identified measured value obtainable by said measurement unit, and including the plurality of channel addresses, such that each of the plurality of sections is associated with a distinct channel address of the plurality of channel addresses;
   a specification unit (i) obtaining the newly measured value from said measurement unit, and (ii) specifying, from the address table, a channel address, of the plurality of channel addresses, that is associated with a section of the plurality of sections that includes the newly measured value, said specification unit specifying the channel address by referring to the address table each time said measurement unit obtains the newly measured value;
   an update unit updating the channel address, which is to be used for the communication with the other device and is stored in said address storage unit, to the channel address specified by said specification unit, said update unit performing the update each time the channel address is specified by said specification unit;
   a receiving unit receiving inquiry data transmitted from the other device;
   a judgment unit judging whether or not the inquiry data received by said receiving unit is directed to the channel address stored in said address storage unit;
   a response generation unit generating response data, which is a response to the inquiry data, when said judgment unit judges that the inquiry data is directed to the channel address stored in said address storage unit; and
   a transmission unit transmitting the response data generated by said response generation unit to the other device.

2. The sensor device according to claim 1,
   wherein said update unit, during a process of performing the update, transmits, to a communication device connected to the network, (i) a request for withdrawal from channel, of the plurality of channels, that is associated with the channel address stored in said address storage unit, before said update unit updates the channel address stored in said address storage unit, and (ii) a request for participation in a channel, of the plurality of channels, that is associated with the updated channel address specified by said specification unit, and wherein said receiving unit receives the inquiry data transmitted from the other device outside the network via the communication device and the network.

3. The sensor device according to claim 1, wherein said update unit:

updates the channel address stored in said address storage unit to the channel address specified by said specification unit, when the newly measured value obtained by said specification unit is not included in the section associated with the channel address stored in said address storage unit; and does not update the channel address stored in said address storage unit to the channel address specified by said specification unit, when the newly measured value obtained by said specification unit is included in the section associated with the channel address stored in said address storage unit.

4. The sensor device according to claim 1, wherein said update unit:

updates the channel address stored in said address storage unit to the channel address specified by said specification unit, when the channel address specified by said specification unit is different from the channel address stored in said address storage unit, and does not update the channel address stored in said address storage unit to the channel address specified by said specification unit, when the channel address specified by said specification unit matches the channel address stored in said address storage unit.

5. The sensor device according to claim 1, wherein each of the plurality of channel addresses included in the address table is an Internet Protocol (IP) multi-cast address.

6. The sensor device according to claim 1, wherein each of the plurality of channel addresses included in the address table is a peer address of a bind point in a peer-to-peer (P2P) network.

7. The sensor device according to claim 1, wherein said update unit updates the channel address stored in said address storage unit to the channel address specified by said specification unit, by (i) additionally storing the channel address specified by said specification unit in said address storage unit, and (ii) deleting the channel address stored in said address storage unit prior to the additional storing of the channel address specified by said specification unit, after a predetermined time has elapsed from a time of the additional storing of the channel address specified by said specification unit in said address storage unit.

8. The sensor device according to claim 1, wherein said response generation unit obtains, from the address table, a previously identified measured value, of the plurality of previously identified measured values, that is associated with a destination address of the inquiry data received by said receiving unit, and generates the response data including the measured value obtained by said response generation unit.

9. The sensor device according to claim 1, wherein said response generation unit obtains the newly measured value from said measurement unit, and generates response data including the newly measured value.

10. The sensor device according to claim 1, wherein an object measured by said measurement unit is a wireless tag including identification information identifying the wireless tag, and wherein said measurement unit obtains, via wireless communication, the identification information as the newly measured value by reading the identification information of the wireless tag.

11. A relay device which relays a communication between a sensor device connected to a first network and a retrieval device connected to a second network, the sensor device measuring a surrounding status and obtaining a newly measured value, the first network having a first plurality of channels for communication, each of the first plurality of channels being associated with a respective channel address of a plurality of channel addresses on the first network, the second network having a second plurality of channels for communication, each of the second plurality of channels being associated with a respective channel address of a plurality of channel addresses on the second network, said relay device comprising:

a relay source table storage unit storing a relay source address table including a plurality of previously identified measured values obtainable by the sensor device and including the plurality of channel addresses on the second network, such that each of the plurality of the previously identified measured values is associated with a distinct channel address of the plurality of channel addresses on the second network;

a relay destination table storage unit storing a relay destination address table including the plurality of previously identified measured values obtainable by the sensor device and including the plurality of channel addresses on the first network, such that each of the plurality of the previously identified measured values is associated with a distinct channel address of the plurality of channel addresses on the first network;

a relay address storage unit storing at least two channel addresses, from among the plurality of channel addresses on the second network included in the relay source address table, necessary for the relay of the communication between the sensor device and the retrieval device;

an update unit updating one of the at least two channel addresses stored in said relay address storage unit to another channel address of the plurality of channel addresses on the second network included in the relay source address table, said update unit performing the update based on a predetermined instruction;

a judgment unit judging whether or not inquiry data transmitted from the retrieval device is directed to a channel address of the at least two channel addresses stored in said relay address storage unit;

a measurement value identification unit identifying, using the inquiry data, a previously identified measured value of the plurality of previously identified measured values included in the relay source address table, the previously identified measured value identified by said measurement value identification unit (i) being one of the plurality of previously identified measured values associated with a channel address, of the plurality of channel addresses on the second network and included in the relay source address table, that matches the channel address of the at least two channel addresses stored in said relay address storage unit, and (ii) being identified when said judgment unit judges that the inquiry data is directed to the channel address of the at least two channel addresses stored in said relay address storage unit;

a relay destination specification unit specifying, from among the plurality of channel addresses on the first network and included in the relay destination address table, a channel address on the first network that is associated with one of the plurality of previously identified measured values related to the previously identified measured value identified by said measurement value identification unit, said relay destination specification unit specifying the channel address on the first network by referring to the relay destination address table; and a transfer unit transmitting the inquiry data to the channel address specified by said relay destination specification unit.

12. The relay device according to claim 11, wherein said measurement value identification unit obtains a destination of the inquiry data, and identifies, from the plurality of previously identified measured values included in the relay source address table, a previously identified measured value associated with a channel address, of the plurality of channel addresses on the second network, that is the destination of the inquiry data.

13. A retrieval device which searches sensor devices, which measure a surrounding status and obtain a newly measured value, via a network having a plurality of channels for communication, each of the plurality of channels being associated with a respective channel address of a plurality of channel addresses, said retrieval device comprising:

a table storage unit storing an address table including a plurality of sections, each of the plurality of sections being associated with at least one separate previously identified measured value obtainable by a sensor device, and including the plurality of channel addresses, such that each of the plurality of sections is associated with a distinct channel address of the plurality of channel addresses;

a receiving unit receiving a search condition including information indicating a section of the plurality of sections;

a specification unit specifying, from the address table, a channel address, of the plurality of channel addresses, that is associated with the section indicated by the search condition received by said receiving unit;

an inquiry generation unit generating, based on the search condition and the specified channel address, inquiry data to be directed to one or more of the sensor devices communicating on one of the plurality of channels associated with the specified channel address; and a communication unit transmitting the inquiry data to the specified channel address, and receiving response data, which is a response transmitted in response to the inquiry data, from the one or more sensor devices.

14. The retrieval device according to claim 13, wherein said inquiry generation unit generates the inquiry data including information indicating the section that is associated with the specified channel address specified by said specification unit and indicated by the search condition.

15. A retrieval system comprising a sensor device and a retrieval device connected to a network having a plurality of channels for communication, each of the plurality of channels being associated with a respective channel address of a plurality of channel addresses, wherein said sensor device includes:

an address storage unit storing a channel address to be used for communication with said retrieval device;

a measurement unit measuring a surrounding status a plurality of times at a predetermined interval, and obtaining a newly measured value each of the plurality of times the surrounding status is measured;

a first table storage unit storing a first address table including a plurality of sections, each of the plurality of sections of the first address table being associated with at least one separate previously identified measured value obtainable by said measurement unit, and including the plurality of channel addresses, such that each of the plurality of sections of the first address table is associated with a distinct channel address of the plurality of channel addresses;

a first specification unit (i) obtaining the newly measured value from said measurement unit, and (ii) specifying, from the first address table, a channel address, of the plurality of channel addresses, that is associated with a section of the plurality of sections that includes the newly measured value, said first specification unit specifying the channel address by referring to the first address table each time said measurement unit obtains the newly measured value;

an update unit updating the channel address, which is to be used for the communication with said retrieval device and is stored in said first address storage unit, to the channel address specified by said first specification unit, said update unit performing the update each time the channel address is specified by said first specification unit;

a first receiving unit receiving inquiry data transmitted from said retrieval device;

a judgment unit judging whether or not the inquiry data received by said first receiving unit is directed to the channel address stored in said first address storage unit;

a response generation unit generating response data, which is a response to the inquiry data, when said judgment unit judges that the inquiry data is directed to the channel address stored in said first address storage unit; and a transmission unit transmitting the response data generated by said response generation unit to said retrieval device, and wherein said retrieval device includes:

a second table storage unit storing a second address table including a plurality of sections, each of the plurality of sections of the second address table being associated with at least one separate previously identified measured value obtainable by said measurement unit, and including the plurality of channel addresses, such that each of the plurality of sections of the second address table is associated with a distinct channel address of the plurality of channel addresses;

a second receiving unit receiving a search condition including information indicating a section of the plurality of sections of the second address table;

a second specification unit specifying, from the second address table, a channel address, of the plurality of channel addresses, that is associated with the section indicated by the search condition received by said second receiving unit;

an inquiry generation unit generating, based on the search condition and the channel address specified by said second specification unit, the inquiry data directed to said sensor device communicating on one of the plurality of channels associated with the channel address specified by said second specification unit; and
a communication unit transmitting the inquiry data to the channel address specified by said second specification unit, and receiving response data, which is a response transmitted in response to the inquiry data, from said sensor device.

16. The retrieval system according to claim 15,
wherein the network is comprised of a first network to which said sensor device is connected and a second network to which said retrieval device is connected,
wherein said retrieval system further comprises a relay device which relays a communication between the first network and the second network,
wherein the first network includes a first plurality of channels for communication, such that each of the first plurality of channels is associated with a respective channel address of a plurality of channel addresses on the first network,
wherein the second network includes a second plurality of channels for communication, such that each of the second plurality of channels is associated with a respective channel address of a plurality of channel addresses on the second network, and
wherein said relay device includes:
a relay source table storage unit storing a relay source address table including the plurality of previously identified measured values obtainable by said sensor device and including the plurality of channel addresses on the second network, such that each of the plurality of the previously identified measured values is associated with a distinct channel address of the plurality of channel addresses on the second network;
a relay destination table storage unit storing a relay destination address table including the plurality of previously identified measured values obtainable by said sensor device and including the plurality of channel addresses on the first network, such that each of the plurality of the previously identified measured values is associated with a distinct channel address of the plurality of channel addresses on the first network;
a relay address storage unit storing at least two channel addresses, from among the plurality of channel addresses on the second network included in the relay source address table, necessary for the relay of the communication between the first network and the second network;
a relay address update unit updating one of the at least two channel addresses stored in said relay address storage unit to another channel address of the plurality of channel addresses on the second network included in the relay source address table, said relay address update unit performing the update based on a predetermined instruction;
a relay judgment unit judging whether or not the inquiry data transmitted from said retrieval device is directed to a channel address of the at least two channel addresses stored in said relay address storage unit;
a measurement value identification unit identifying, using the inquiry data, a previously identified measured value of the plurality of previously identified measured values included in the relay source address table, the previously identified measured value identified by said measurement value identification unit (i) being one of the plurality of previously identified measured values associated with a channel address, of the plurality of channel addresses on the second network and included in the relay source address table, that matches the channel address of the at least two channel addresses stored in said relay address storage unit, and (ii) being identified when said relay judgment unit judges that the inquiry data is directed to the channel address of the at least two channel addresses stored in said relay address storage unit;
a relay destination specification unit specifying, from among the plurality of channel addresses on the first network and included in the relay destination address table, a channel address on the first network that is associated with one of the plurality of previously identified measured values related to the previously identified measured value identified by said measurement value identification unit, said relay destination specification unit specifying the channel address on the first network by referring to the relay destination address table; and
a transfer unit transmitting the inquiry data to the channel address specified by said relay destination specification unit.

17. A communication method for use in a sensor device which communicates with another device via a network having a plurality of channels for communication, each of the plurality of channels being associated with a respective channel address of a plurality of channel addresses,
wherein the sensor device includes:
an address storage unit storing a channel address to be used for the communication with the other device; and
a table storage unit storing an address table including a plurality of sections, each of the plurality of sections being associated with at least one separate previously identified measured value obtainable by the sensor device, and including the plurality of channel addresses, such that each of the plurality of sections is associated with a distinct channel address of the plurality of channel addresses, and
wherein said communication method comprises:
a measurement step of measuring a surrounding status a plurality of times at a predetermined interval, and obtaining a newly measured value each of the plurality of times the surrounding status is measured;
a specification step of specifying, from the address table, a channel address, of the plurality of channel addresses, that is associated with a section of the plurality of sections that includes the newly measured value obtained in said measurement step, said specification step specifying the channel address by referring to the address table each time said measurement step obtains the newly measured value;
an update step of updating the channel address, which is to be used for the communication with the other device and is stored in the address storage unit, to the channel address specified in said specification step, said update step performing the updating each time the channel address is specified by said specification step;
a receiving step of receiving inquiry data transmitted from the other device;
a judgment step of judging whether or not the inquiry data received in said receiving step is directed to the channel address stored in the address storage unit;
a response generation step of generating response data, which is a response to the inquiry data, when said judgment step judges that the inquiry data is directed to the channel address stored in the address storage unit; and a transmission step of transmitting the response data generated in said generation step to the other device.

18. A non-transitory computer-readable recording medium having a program recorded thereon, the program for a sensor device which communicates with another device via a network having a plurality of channels for communication, each of the plurality of channels being associated with a respective channel address of a plurality of channel addresses, wherein the sensor device includes:
an address storage unit storing a channel address to be used for the communication with the other device; and
a table storage unit storing an address table including a plurality of sections, each of the plurality of sections being associated with at least one separate previously identified measured value obtainable by the sensor device, and including the plurality of channel addresses, such that each of the plurality of sections is associated with a distinct channel address of the plurality of channel addresses, and wherein the program causes a computer to execute a communication method comprising:
a measurement step of measuring a surrounding status a plurality of times at a predetermined interval, and obtaining a newly measured value each of the plurality of times the surrounding status is measured;
a specification step of specifying, from the address table, a channel address, of the plurality of channel addresses, that is associated with a section of the plurality of sections that includes the newly measured value obtained in said measurement step, said specification step specifying the channel address by referring to the address table each time said measurement step obtains the newly measured value;
an update step of updating the channel address, which is to be used for the communication with the other device and is stored in the address storage unit, to the channel address specified in said specification step, said update step performing the updating each time the channel address is specified in said specification step;
a receiving step of receiving inquiry data transmitted from the other device;
a judgment step of judging whether or not the inquiry data received in said receiving step is directed to the channel address stored in the address storage unit;
a response generation step of generating response data, which is a response to the inquiry data, when said judgment step judges that the inquiry data is directed to the channel address stored in the address storage unit; and
a transmission step of transmitting the response data generated in said generation step to the other device.

19. A relay method for a relay device which relays a communication between a sensor device connected to a first network and a retrieval device connected to a second network, the sensor device measuring a surrounding status, and obtaining a newly measured value, the first network having a first plurality of channels for communication, each of the first plurality of channels being associated with a respective channel address of a plurality of channel addresses on the first network, the second network having a second plurality of channels for communication, each of the second plurality of channels being associated with a respective channel address of a plurality of channel addresses on the second network, wherein the relay device includes:
a relay source table storage unit storing a relay source address table including a plurality of previously identified measured values obtainable by the sensor device and including the plurality of channel addresses on the second network, such that each of the plurality of the previously identified measured values is associated with a distinct channel address of the plurality of channel addresses on the second network;
a relay destination table storage unit storing a relay destination address table including the plurality of previously identified measured values obtainable by the sensor device and including the plurality of channel addresses on the first network, such that each of the plurality of the previously identified measured values is associated with a distinct channel address of the plurality of channel addresses on the first network; and
a relay address storage unit storing at least two channel addresses, from among the plurality of channel addresses on the second network included in the relay source address table, necessary for the relay of the communication between the sensor device and the retrieval device, and wherein said relay method comprises:
an update step of updating one of the at least two channel addresses stored in the relay address storage unit to another channel address of the plurality of channel addresses on the second network included in the relay source address table, said update step performing the update based on a predetermined instruction;
a judgment step of judging whether or not inquiry data transmitted from the retrieval device is directed to a channel address of the at least two channel addresses stored in the relay address storage unit;
a measurement value identification step of identifying, using the inquiry data, a previously identified measured value of the plurality of previously identified measured values included in the relay source address table, the previously identified measured value identified in said measurement value identification step (i) being one of the plurality of previously identified measured values associated with a channel address, of the plurality of channel addresses on the second network and included in the relay source address table, that matches the channel address of the at least two channel addresses stored in the relay address storage unit, and (ii) being identified when said judgment step judges that the inquiry data is directed to the channel address of the at least two channel addresses stored in the relay address storage unit;
an address specification step of specifying, from among the plurality of channel addresses on the first network and included in the relay destination address table, a channel address on the first network that is associated with one of the plurality of previously identified measured values related to the previously identified measured value identified in said measurement value identification step, said address specification step specifying the channel address on the first network by referring to the relay destination address table; and
a transfer step of transmitting the inquiry data to the channel address specified in said address specification step.

20. A non-transitory computer-readable recording medium having a program recorded thereon, the program for a relay device which relays a communication between a sensor device connected to a first network and a retrieval device connected to a second network, the sensor device measuring a surrounding status and obtaining a newly measured value, the first network having a first plurality of channels for communication, each of the first plurality of channels being associated with a respective channel address of a plurality of channel addresses on the first network, the second network having a second plurality of channels for communication, each of the second plurality of channels being associated with a respective channel address of a plurality of channel addresses on the second network, wherein the relay device includes:

a relay source table storage unit storing a relay source address table including a plurality of previously identified measured values obtainable by the sensor device and including the plurality of channel addresses on the second network, such that each of the plurality of the previously identified measured values is associated with a distinct channel address of the plurality of channel addresses on the second network;

a relay destination table storage unit storing a relay destination address table including the plurality of previously identified measured values obtainable by the sensor device and including the plurality of channel addresses on the first network, such that each of the plurality of the previously identified measured values is associated with a distinct channel address of the plurality of channel addresses on the first network; and a relay address storage unit storing at least two channel addresses, from among the plurality of channel addresses on the second network included in the relay source address table, necessary for the relay of the communication between the sensor device and the retrieval device, and wherein the program causes a computer to execute a relay method comprising:

an update step of updating one of the at least two channel addresses stored in the relay address storage unit to another channel address of the plurality of channel addresses on the second network included in the relay source address table, said update step performing the update based on a predetermined instruction;

a judgment step of judging whether or not inquiry data transmitted from the retrieval device is directed to a channel address of the at least two channel addresses stored in the relay address storage unit;

a measurement value identification step of identifying, using the inquiry data, a previously identified measured value of the plurality of previously identified measured values included in the relay source address table, the previously identified measured value identified in said measurement value identification step (i) being one of the plurality of previously identified measured values associated with a channel address, of the plurality of channel addresses on the second network and included in the relay source address table, that matches the channel address of the at least two channel addresses stored in the relay address storage unit, and (ii) being identified when said judgment step judges that the inquiry data is directed to the channel address of the at least two channel addresses stored in the relay address storage unit;

an address specification step of specifying, from among the plurality of channel addresses on the first network and included in the relay destination address table, a channel address on the first network that is associated with one of the plurality of previously identified measured values related to the previously identified measured value identified in said measurement value identification step, said address specification step specifying the channel address on the first network by referring to the relay destination address table; and a transfer step of transmitting the inquiry data to the channel address specified in said address specification step.

21. A search method for use in a retrieval device which searches sensor devices, which measure a surrounding status and obtain a newly measured value, via a network having a plurality of channels for communication, each of the plurality of channels being associated with a respective channel address of a plurality of channel addresses, wherein the retrieval device includes a table storage unit storing an address table including a plurality of sections, each of the plurality of sections being associated with at least one separate previously identified measured value obtainable by a sensor device, and includes the plurality of channel addresses, such that each of the plurality of sections is associated with a distinct channel address of the plurality of channel addresses, and wherein said search method comprises:

a receiving step of receiving a search condition including information indicating a section of the plurality of sections;

a specification step of specifying, from the address table, a channel address, of the plurality of channel addresses, that is associated with the section indicated by the search condition received in said receiving step;

an inquiry generation step of generating, based on the search condition and the specified channel address, inquiry data to be directed to one or more of the sensor devices communicating on one of the plurality of channels associated with the specified channel address; and a communication step of transmitting the inquiry data to the specified channel address, and receiving response data, which is a response transmitted in response to the inquiry data, from the one or more sensor devices.

22. A non-transitory computer-readable recording medium having a program recorded thereon, the program for use in a retrieval device which searches sensor devices, which measure a surrounding status and obtain a newly measured value, via a network having a plurality of channels for communication, each of the plurality of channels being associated with a respective channel address of a plurality of channel addresses, wherein the retrieval device includes a table storage unit storing an address table including a plurality of sections, each of the plurality of sections being associated with at least one separate previously identified measured value obtainable by a sensor device, and including the plurality of channel addresses, such that each of the plurality of sections is associated with a distinct channel address of the plurality of channel addresses, and wherein the program causes a computer to execute a search method comprising:

a receiving step of receiving a search condition including information indicating a section of the plurality of sections;

a specification step of specifying, from the address table, a channel address, of the plurality of channel addresses, that is associated with the section indicated by the search condition received in said receiving step;

an inquiry generation step of generating, based on the search condition and the specified channel address, inquiry data to be directed to one or more of the sensor devices communicating on one of the plurality of channels associated with the specified channel address; and a communication step of transmitting the inquiry data to the specified channel address, and receiving response data, which is a response transmitted in response to the inquiry data, from the one or more sensor devices.

* * * * *